United States Patent
Balasubramanian et al.

(10) Patent No.: US 9,756,088 B2
(45) Date of Patent: Sep. 5, 2017

(54) IMS OVER SOFT AP ADMISSION CONTROL AND RESOURCE MANAGEMENT

(71) Applicant: QUALCOMM Incorporated, San Diego, CA (US)

(72) Inventors: Srinivasan Balasubramanian, San Diego, CA (US); Kirankumar Bhoja Anchan, San Diego, CA (US); Arvind Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 14/848,192

(22) Filed: Sep. 8, 2015

(65) Prior Publication Data
US 2017/0070543 A1 Mar. 9, 2017

(51) Int. Cl.
| | |
|---|---|
| H04L 29/06 | (2006.01) |
| H04W 28/02 | (2009.01) |
| H04W 48/18 | (2009.01) |
| H04W 76/02 | (2009.01) |
| H04W 88/16 | (2009.01) |
| H04W 8/08 | (2009.01) |

(Continued)

(52) U.S. Cl.
CPC ......... *H04L 65/1069* (2013.01); *H04W 8/082* (2013.01); *H04W 28/0268* (2013.01); *H04W 28/24* (2013.01); *H04W 48/06* (2013.01); *H04W 48/18* (2013.01); *H04W 76/022* (2013.01); *H04W 76/025* (2013.01); *H04W 88/16* (2013.01); *H04W 84/042* (2013.01); *H04W 84/12* (2013.01)

(58) Field of Classification Search
CPC ..... H04W 8/082; H04W 28/24; H04W 48/06; H04W 76/02; H04W 76/022; H04W 76/025; H04W 84/12; H04W 88/16; H04W 8/08; H04W 28/02; H04W 28/0268; H04W 48/18; H04W 84/042; H04L 29/06; H04L 65/1069
See application file for complete search history.

(56) References Cited

U.S. PATENT DOCUMENTS

| | | | |
|---|---|---|---|
| 8,831,658 | B2 | 9/2014 | Meylan et al. |
| 8,837,408 | B2 | 9/2014 | Sun |

(Continued)

FOREIGN PATENT DOCUMENTS

EP 2613592 A1 7/2013

OTHER PUBLICATIONS

International Search Report and Written Opinion—PCT/US2016/042116—ISA/EPO—Sep. 30, 2016.

*Primary Examiner* — Tri H Phan
(74) *Attorney, Agent, or Firm* — Arent Fox LLP

(57) ABSTRACT

In an aspect of the disclosure, a method, a computer-readable medium, and an apparatus are provided. The apparatus may be a first UE. The UE receives an IP packet including header information and data for a MBMS session. The first UE establishes a WWAN communication link with a base station through a WWAN RAT. The first UE provides an access point accessing the WWAN communication link to at least one second UE through a WLAN RAT. The first UE determines a channel condition of the WWAN communication link. The first UE manages at least one multimedia service between the base station and the at least one second UE based on the channel condition.

32 Claims, 21 Drawing Sheets

(51) Int. Cl.
  *H04W 28/24* (2009.01)
  *H04W 48/06* (2009.01)
  H04W 84/04 (2009.01)
  H04W 84/12 (2009.01)

(56) References Cited

U.S. PATENT DOCUMENTS

| | | | |
|---|---|---|---|
| 9,137,709 B2* | 9/2015 | Diachina | H04W 36/0022 |
| 9,532,274 B2* | 12/2016 | Faurie | H04W 36/0022 |
| 2005/0136898 A1* | 6/2005 | Shaheen | H04W 88/06 |
| | | | 455/414.1 |
| 2010/0296499 A1 | 11/2010 | Karaoguz et al. | |
| 2011/0028120 A1* | 2/2011 | Wu | H04W 36/0022 |
| | | | 455/404.1 |
| 2011/0188457 A1* | 8/2011 | Shu | H04W 28/24 |
| | | | 370/329 |
| 2011/0212723 A1* | 9/2011 | Kunz | H04W 36/0022 |
| | | | 455/435.1 |
| 2012/0250622 A1* | 10/2012 | Gomez Diaz | H04L 45/306 |
| | | | 370/328 |
| 2013/0265937 A1* | 10/2013 | Jain | H04W 4/005 |
| | | | 370/328 |
| 2013/0308620 A1* | 11/2013 | Bharadwaj | H04W 40/02 |
| | | | 370/338 |
| 2014/0078898 A1* | 3/2014 | Anchan | H04W 28/0268 |
| | | | 370/230 |
| 2014/0329526 A1 | 11/2014 | Sundararajan et al. | |
| 2015/0049707 A1 | 2/2015 | Vajapeyam et al. | |
| 2015/0327207 A1* | 11/2015 | Bharadwaj | H04W 8/04 |
| | | | 455/435.2 |
| 2016/0112943 A1* | 4/2016 | Horn | H04W 8/065 |
| | | | 370/329 |

* cited by examiner

IMS OVER SOFT AP ADMISSION CONTROL AND RESOURCE MANAGEMENT

BACKGROUND

Field

The present disclosure relates generally to communication systems, and more particularly, to techniques of Internet protocol (IP) multimedia subsystem (IMS) admission control and resource management for user equipment accessing network connectivity through a soft access point (AP).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, according to an example, a method of wireless communication of a first user equipment (UE) is provided. The method includes establishing a wireless wide area network (WWAN) communication link with a base station through a WWAN radio access technology (RAT). The method includes providing an access point accessing the WWAN communication link to at least one second UE through a wireless local area network (WLAN) RAT. The method includes determining a channel condition of the WWAN communication link. The method includes managing at least one multimedia service between the base station and the at least one second UE based on the channel condition.

According to an example, an apparatus for wireless communication is provided. The apparatus may be a first UE. The apparatus includes means for establishing a WWAN communication link with a base station through a WWAN RAT. The apparatus includes means for providing an access point accessing the WWAN communication link to at least one second UE through a WLAN RAT. The apparatus includes means for determining a channel condition of the WWAN communication link. The apparatus includes means for managing at least one multimedia service between the base station and the at least one second UE based on the channel condition.

According to an example, an apparatus for wireless communication is provided. The apparatus may be a first UE. The apparatus includes a memory and at least one processor coupled to the memory and configured to establish a WWAN communication link with a base station through a WWAN RAT. The at least one processor is further configured to provide an access point accessing the WWAN communication link to at least one second UE through a WLAN RAT. The at least one processor is further configured to determine a channel condition of the WWAN communication link. The at least one processor is further configured to manage at least one multimedia service between the base station and the at least one second UE based on the channel condition.

According to an example, a computer-readable medium storing computer executable code for wireless communication at a UE is provided. The computer-readable medium includes code for establishing a WWAN communication link with a base station through a WWAN RAT. The computer-readable medium includes code for providing an access point accessing the WWAN communication link to at least one second UE through a WLAN RAT. The computer-readable medium includes code for determining a channel condition of the WWAN communication link. The computer-readable medium includes code for managing at least one multimedia service between the base station and the at least one second UE based on the channel condition.

DETAILED DESCRIPTION

Figure 1:
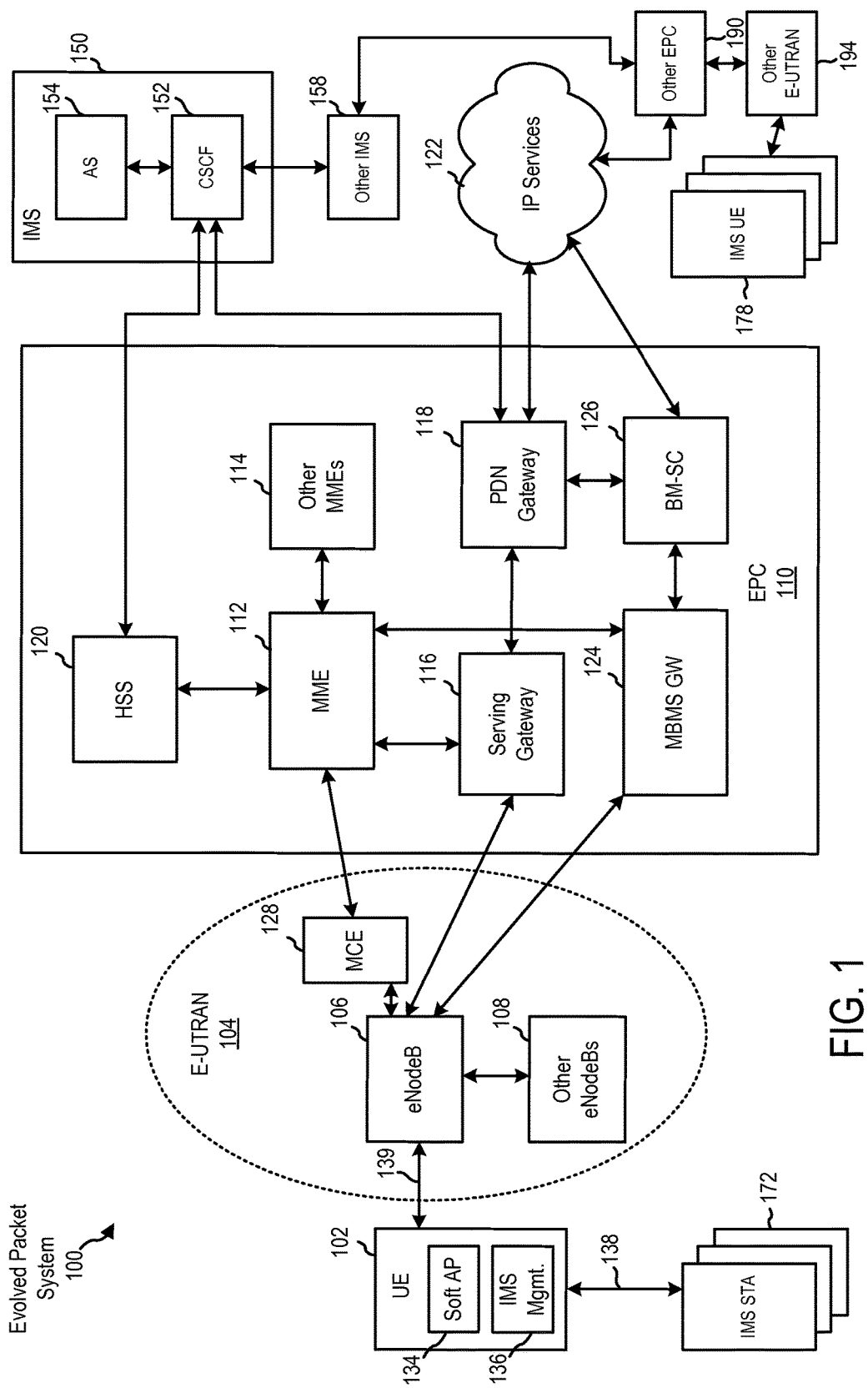
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In certain configurations, the UE 102 may include a soft AP 134 and an IMS manager 136. As described supra, the UE 102 may establish an LTE link 139 (i.e., a WWAN link) with the eNB 106. The soft AP 134 provides network connectivity to one or more IMS stations (STAs) 172 (e.g., IMS UEs in a WLAN). For example, each IMS STA 172 may establish a WLAN link 138 with the soft AP 134. Through the network connectivity provided by the soft AP 134, the IMS STAs 172 may use IMS services.

The EPS 100 may include an IMS system 150. The IMS system 150 includes, among others, a call session control function (CSCF) 152 and one or more application servers 154. The CSCF 152 may include a serving CSCF (S-CSCF), one or more proxy CSCFs (P-CSCFs), and one or more interrogating CSCF (I-CSCF). The IMS system 150 may be in communication with other IMS systems 158.

Further, IMS UEs 178 may be in communication with the IP services 122 and the other IMS systems 158 though another E-UTRAN 194 and another EPC 190. Thus, the IMS STAs 172 and the IMS UEs 178 may establish IMS services between them. The IMS manager 136 of the UE 102 may control a process of determining a channel condition of the LTE link 139. The IMS manager 136 may also control a process of managing at least one multimedia service between the eNB 106 and the IMS STAs 172 based on the channel condition.

Figure 2:
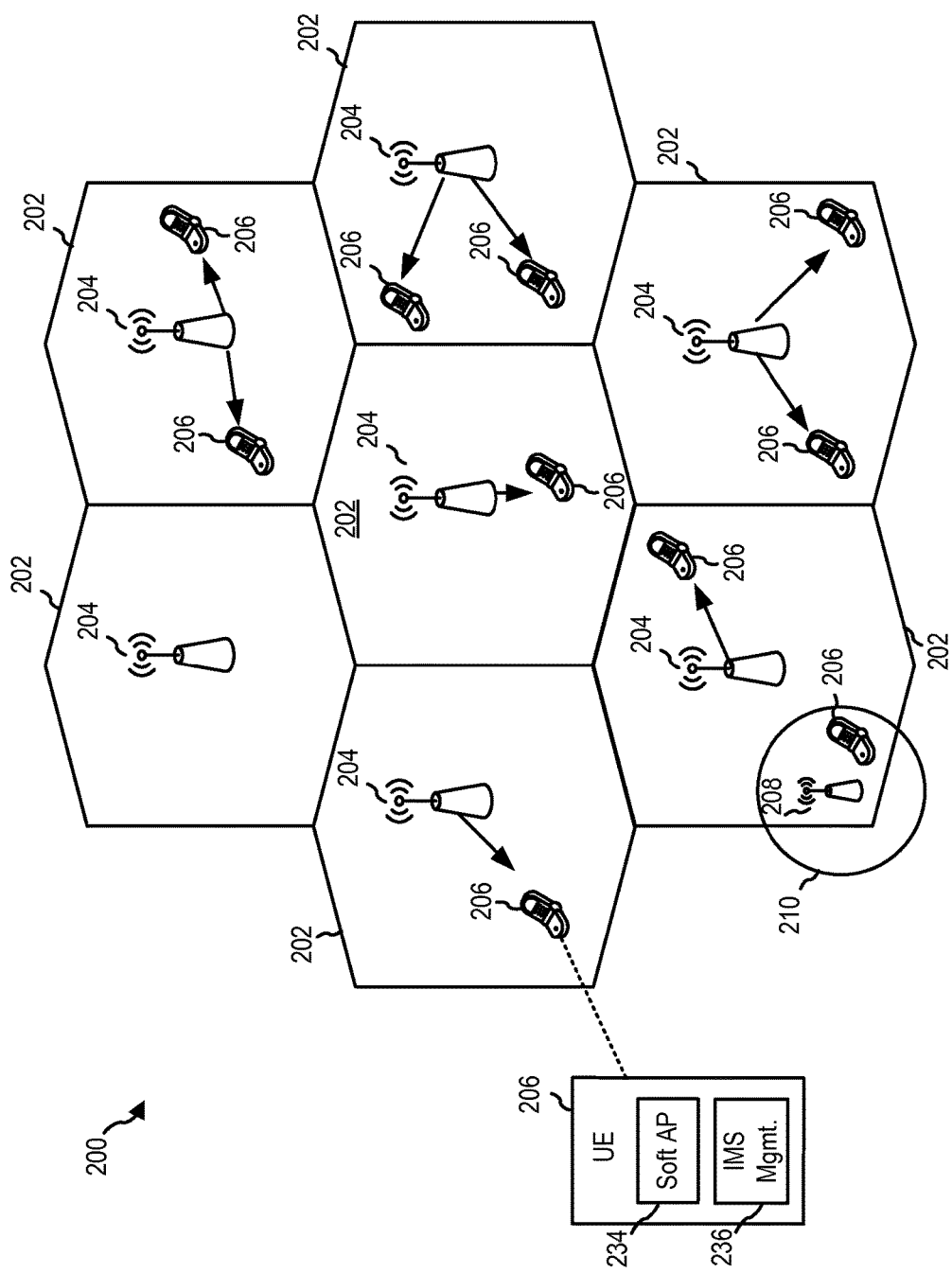
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

The UE 206 may include a soft AP 234 and an IMS manager 236. In one configuration, the soft AP 234 may control a process of establishing a WWAN communication link with the eNB 204 through a WWAN RAT. The soft AP 234 may also control a process of providing an access point accessing the WWAN communication link to at least one second UE through a WLAN RAT. The IMS manager 236 may control a process of determining a channel condition of the WWAN communication link. The IMS manager 236 may also control a process of managing at least one multimedia service between the eNB 204 and the at least one second UE based on the channel condition.

Figure 3:
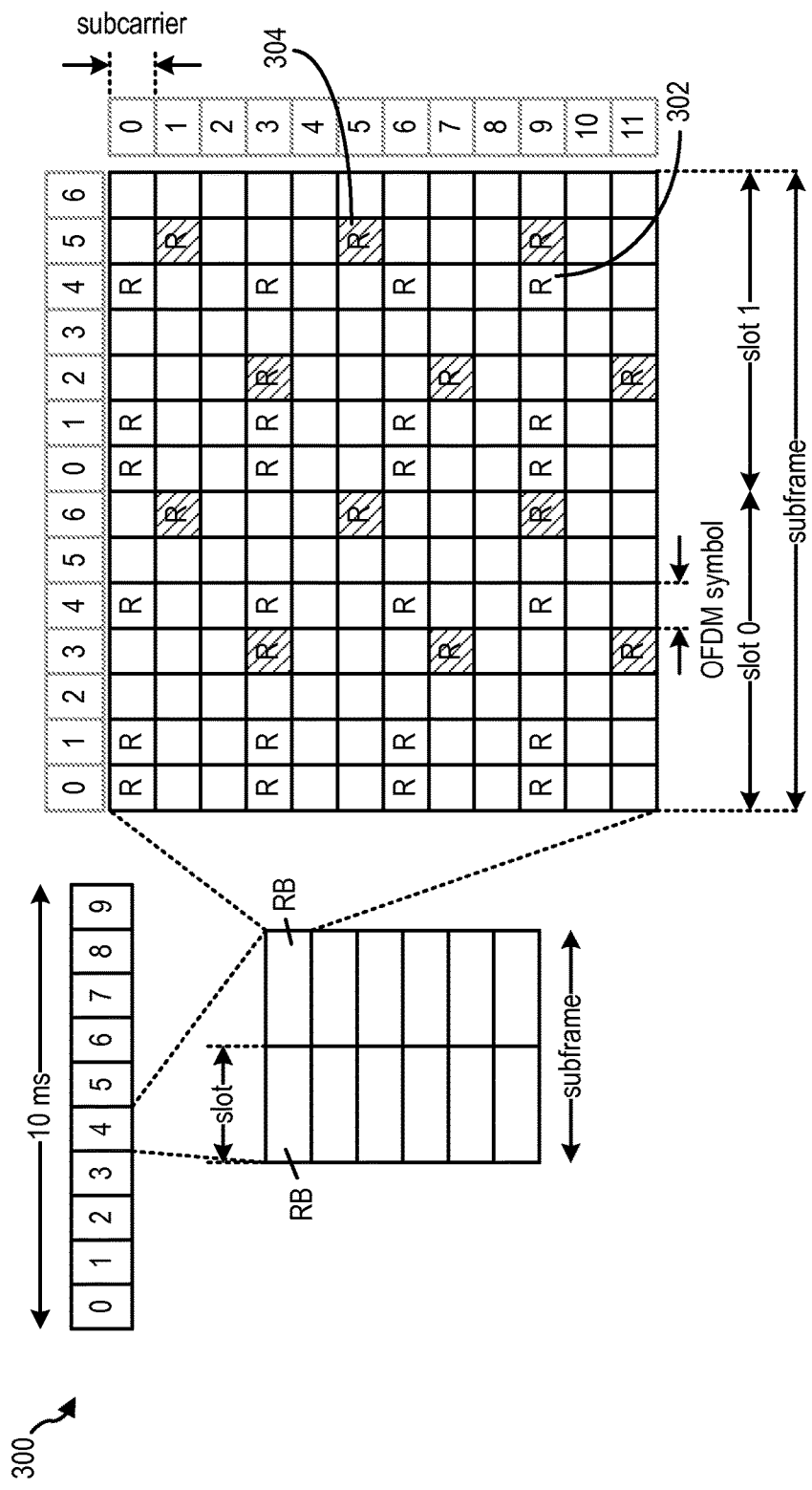
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
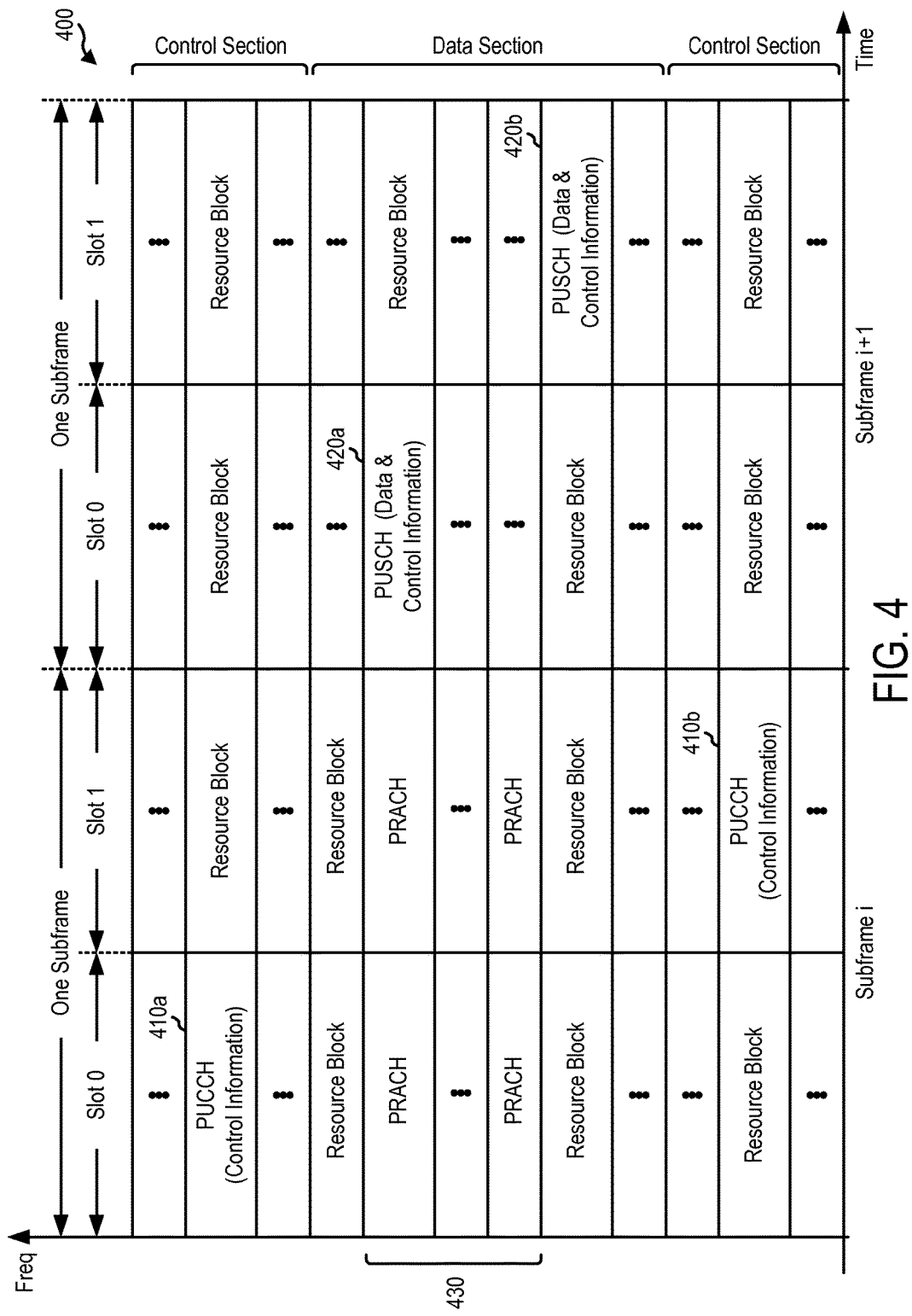
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
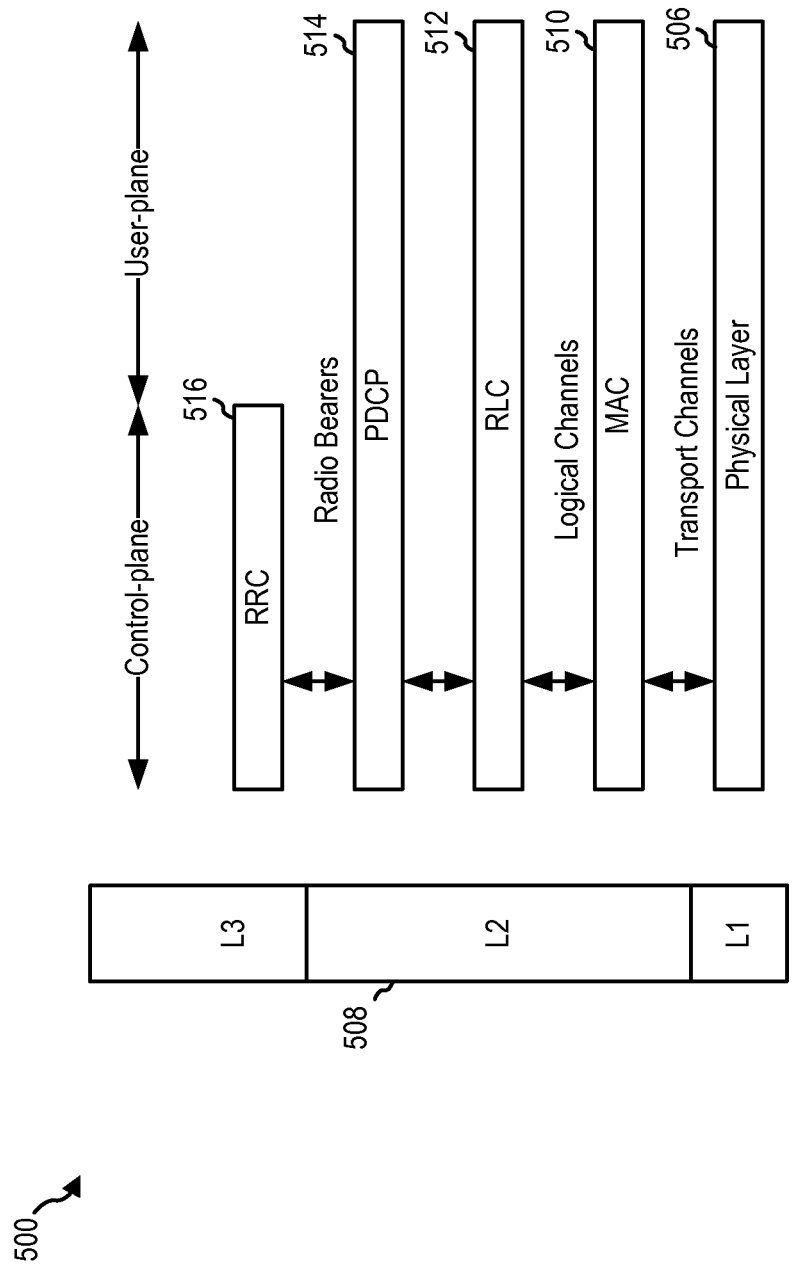
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
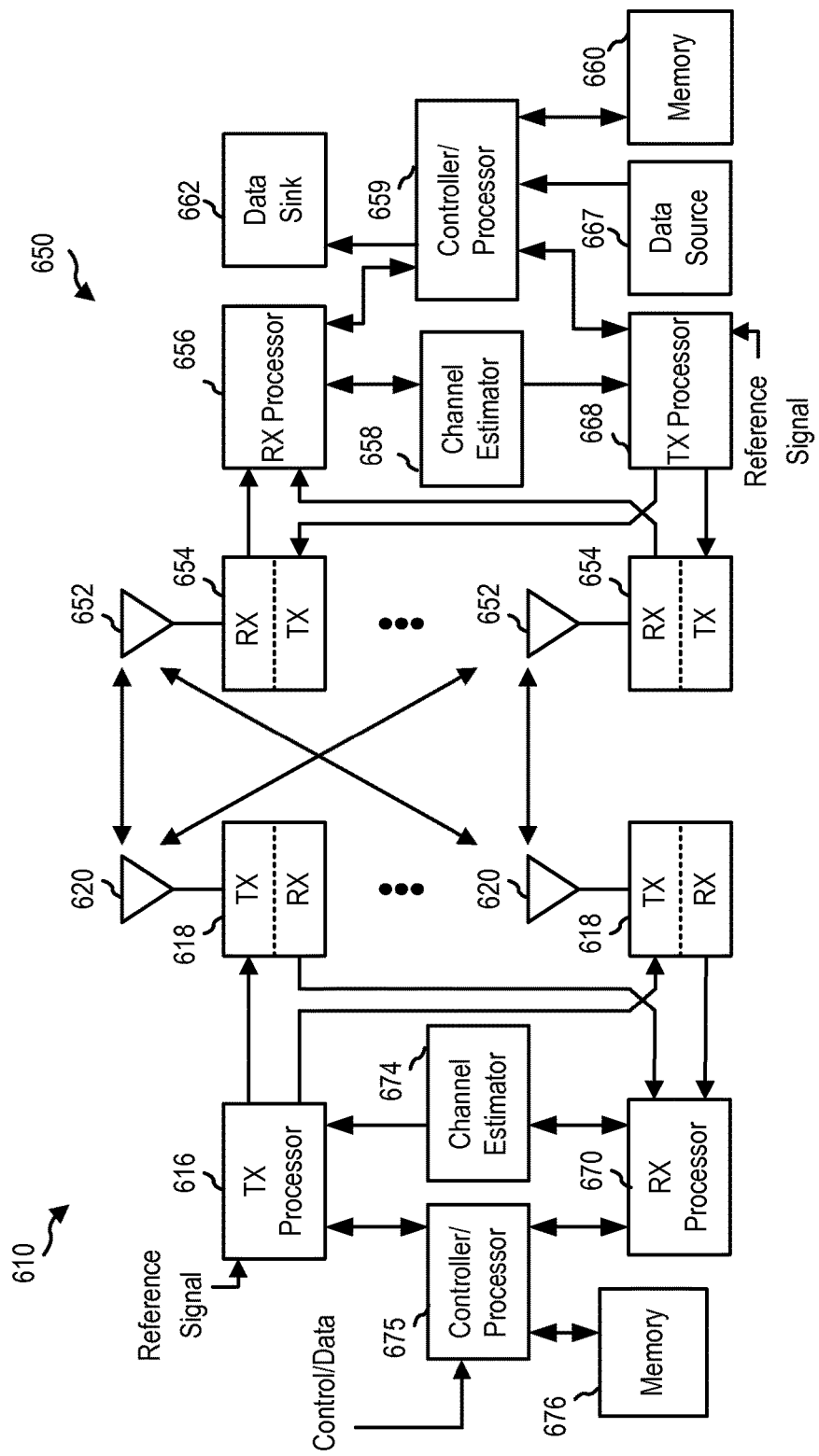
FIG. 6 is a diagram illustrating an example of an evolved Node B (eNodeB) and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
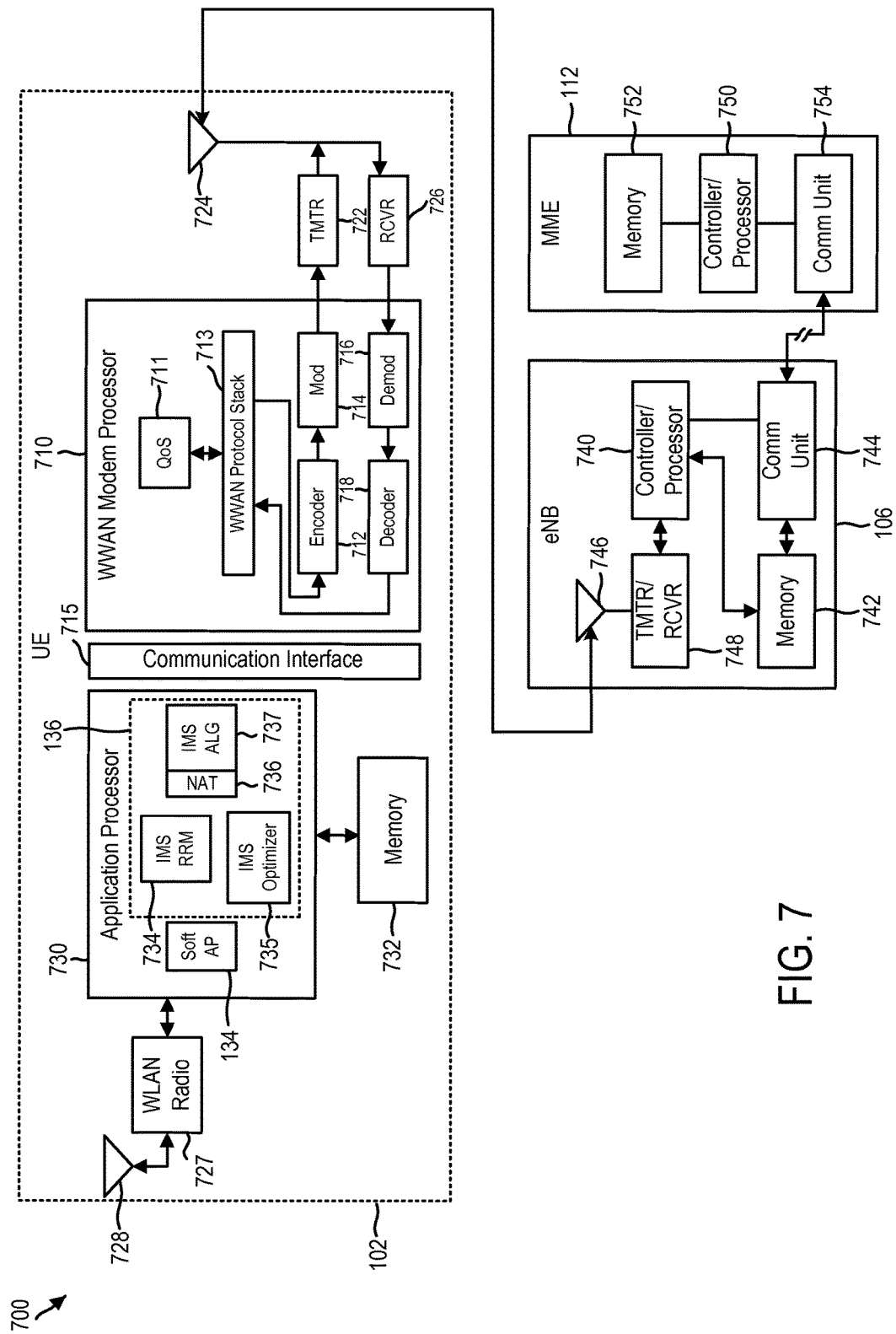
FIG. 7 shows a block diagram of a design of a UE, an eNodeB, and a mobility management entity (MME).

FIG. 7 shows a block diagram 700 of a design of UE 102, eNB 106, and MME 112. At UE 102, an encoder 712 may receive traffic data and signaling messages to be sent on the uplink. The encoder 712 may process (e.g., format, encode, and interleave) the traffic data and signaling messages. A modulator (Mod) 714 may further process (e.g., symbol map and modulate) the encoded traffic data and signaling messages and provide output samples. A transmitter (TMTR) 722 may condition (e.g., convert to analog, filter, amplify, and frequency upconvert) the output samples and generate an uplink signal, which may be transmitted via an antenna 724 to eNB 106.

On the downlink, antenna 724 may receive downlink signals transmitted by eNB 106 and/or other eNBs/base stations. A receiver (RCVR) 726 may condition (e.g., filter, amplify, frequency downconvert, and digitize) the received signal from antenna 724 and provide input samples. A demodulator (Demod) 716 may process (e.g., demodulate) the input samples and provide symbol estimates. A decoder 718 may process (e.g., deinterleave and decode) the symbol estimates and provide decoded data and signaling messages sent to UE 102. Encoder 712, modulator 714, demodulator 716, and decoder 718 may be implemented by a modem processor 710. These units may perform processing in accordance with a radio access technology (RAT) (e.g., LTE, 1×RTT, etc.) used by the wireless network with which UE 102 is in communication. Further, the modem processor 710 may also execute a quality of service (QoS) function 711 and a WWAN protocol stack 713. The services and applications running on the application processor 730 may call the WWAN protocol stack 713 to communicate on the LTE link 139. The services and applications running on the application processor 730 may call the QoS function 711 to set up QoS parameters on the LTE link 139.

An application processor 730 may direct the operation at UE 102. The application processor 730 may also perform or direct other processes for the techniques described herein. The memory 732 may store code for an IMS radio resource management (RRM) 734, an IMS optimizer 735, a network address translation (NAT) function 736, and an IMS application layer gateway (ALG) 737. The application processor 730 may read the code from the memory 732 and may execute the IMS RRM 734, the IMS optimizer 735, the NAT function 736, and the IMS ALG 737.

As illustrated, UE 102 may also include circuitry (generally denoted as WLAN radio 727) to communication with a WLAN via one or more antennas 728. WLAN radio 727 may include circuitry similar to that described supra for communicating via the WWAN (e.g., a WLAN modem processor, a transmitter, and a receiver). As described supra, the application processor 730 executes the soft AP 134 to act as an access point and to share a WWAN connection among WLAN connections.

At the eNB 106, a transmitter/receiver 748 may support radio communication with UE 102 and other UEs. A controller/processor 740 may perform various functions for communication with the UEs. On the uplink, the uplink signal from UE 102 may be received via an antenna 746, conditioned by receiver 748, and further processed by controller/processor 740 to recover the traffic data and signaling messages sent by UE 102. On the downlink, traffic data and signaling messages may be processed by controller/processor 740 and conditioned by transmitter 748 to generate a downlink signal, which may be transmitted via antenna 746 to UE 102 and other UEs. Controller/processor 740 may also perform or direct other processes for the techniques described herein.

At the MME 112, a controller/processor 750 may perform various functions to support communication services for UEs. A memory 752 may store program codes and data for MME 112. A communication unit 754 may support communication with other network entities.

FIG. 7 shows simplified designs of the UE 102, the eNB 106, and the MME 112.

In general, each entity may include any number of transmitters, receivers, processors, controllers, memories, communication units, etc. Other network entities may also be implemented in similar manner.

Figure 8:
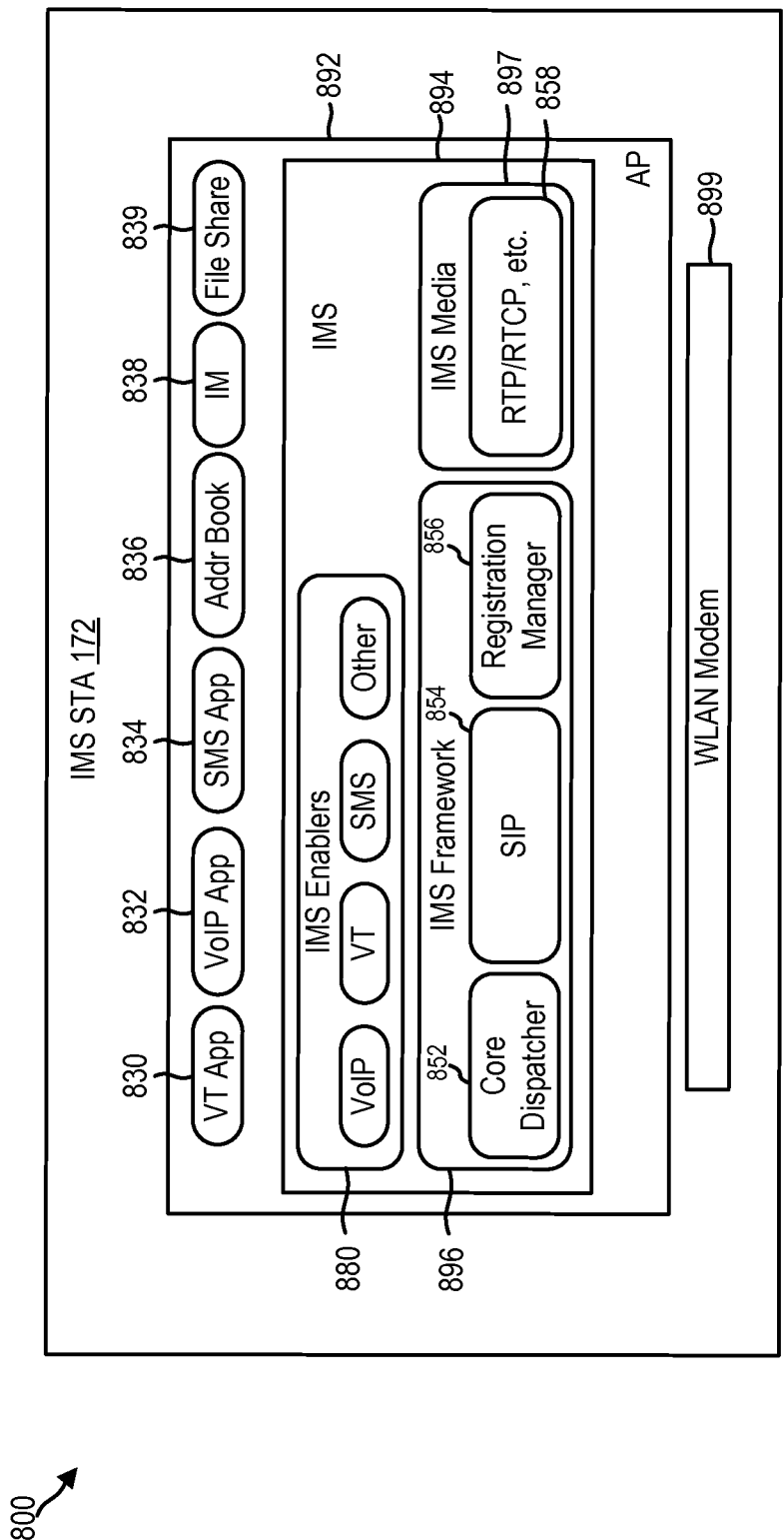
FIG. 8 is a diagram illustrating an IMS station (STA).

FIG. 8 is a diagram 800 illustrating an IMS station (STA). The application processor 892 may also execute an IMS component 894 to support IMS services 880 including voice over internet protocol (VoIP), video telephony (VT), and short message service (SMS), etc. One or more applications executed on the application processor 892 may employ the IMS services 880 provided by the IMS component 894. In this example, the applications include, among others, a VT application 830, a VoIP application 832, an SMS application 834, an address book application 836, an instant messenger application 838, and a file share application 839.

The IMS component 894 may provide a standards-based networking architecture for multimedia services provided on the IMS STA 172. The IMS services 880 utilize an IMS framework 896 and an IMS media function 897, through a WLAN modem 899, to communicate with the IMS system 150 or remote IMS UEs 178. The IMS framework 896 may include, among others, a core dispatcher 852, a session initiation protocol (SIP) function 854, and a registration manager 856.

The core dispatcher 852 may use one or more IMS registrations to provide a point of access for communication with the IMS system 150 and/or the IMS UE 178 for the IMS services 880. The core dispatcher 852 can handle data flows related to the IMS services 880 and direct the data flows to the IMS media function 897. The IMS services 880 may be registered using IMS service tags. The core dispatcher 852 may route data flows from the IMS media function 897 to the IMS services 880 based on the IMS service tags used to register the IMS services 880.

IMS registration may involve the exchange of SIP messages to control communication sessions supporting services such as voice and video calls over IP, LTE and other data networks. SIP may be used for establishing, modifying and terminating communications sessions and the sessions may be used for multiple streams that support the IMS services 880. The SIP function 854 and the registration manager 856 may be used to support the IMS registration. The IMS media function 897 includes RTP/RTCP and other functions 858 that may be used by the IMS services 880 to transport service data flows.

The UE 102 that provides a soft AP may have limited resources. Without sufficient regulation and resource optimization, unlike for best effort traffic, the user experience for IMS services at the IMS STA 172, which accesses network connectivity through the soft AP provide by the UE 102, may suffer. For example, in certain configurations, the IMS component 894 of the IMS STA 172 may set up QoS parameters for the WLAN link 138 established with the soft AP 134 on the UE 102. The soft AP 134, however, may still only request the QoS function 711 and the WWAN protocol stack 713 to set up one or more best effort EPS bearers on the LTE link 139, as the soft AP 134 may not be aware of the IMS services used by the IMS STA 172. Consequently, the best effort EPS bearers may be used to carry the IMS services. This may not be sufficient as the throughput on the WLAN link 138 may be higher than the LTE link 139. In other words, having end-to-end QoS alone may not solve the issues involved. To address the issues, there may be a need for admission control. More specifically, based on the throughput experienced on the LTE link 139, the allowed number of users and services enabled on the IMS STAs 172 may be controlled. Otherwise, inferior user experience may exist.

Further, in certain configurations, the soft AP 134 may always reserve, through the QoS function 711, one or more EPS bearers having QoS requirements for IMS services without giving much consideration of the best effort traffic. Thus, the best effort traffic may not be allocated adequate resources. Conventional QoS schemes may not account for these factors. Further, conventional schemes may not be able to enable Robust Header Compression (RoHC) on the LTE link 139 for a VoIP service.

In addition, in certain configurations, VoIP and VT parameters such as dejitter buffer, RTP redundancy, bundling, etc. may be tuned for only one RAT. Given that the soft AP 134 bridges the LTE link 139 and the WLAN link 138 and that the IMS STAs 172 may be only aware of the WLAN link 138, a conventional QoS scheme only adjusting QoS parameters based on the WLAN link 138 may not optimize the IMS service performance transported on both the WLAN link 138 and the LTE link 139.

Further, the IMS STA 172 and the IMS UE 178 may use a VT service. VT rate adaptation for the IMS STA 172 may be performed on the UE 102. The soft AP 134 may determine that the IMS STA 172 is on a WLAN link 138 and may estimate the rate based on the WLAN link 138. The rate estimation may be inaccurate as the soft AP 134 may determine the parameters like QoS, available instantaneous bit rate, etc. based on the WLAN link 138. This may lead to a sub optimal VT call.

Further, using the soft AP 134 may introduce additional delays for the IMS services relayed through the soft AP 134. Conventional QoS schemes may not manage best effort traffic, WiFi offloading, IMS, and voice services policy management that is based on WWAN services.

To address the issues described supra, the UE 102 may implement the features described herein. In one example, an IMS STA 172 initially associates with the soft AP 134 on the UE 102 and establishes the WLAN link 138 with the soft AP 134. Subsequently, one of the applications 830, 832, 834, 836, 838, 839 may attempt to use one of the IMS services 880 (e.g., VoIP) to communicate with an IMS UE 178. Accordingly, the SIP function 854 may construct a SIP message (e.g., INVITE) addressed to the IMS UE 178 and may send the SIP message to the soft AP 134 for routing to the CSCF 152. In another example, the IMS UE 178 may attempt to establish an IMS service with the IMS STA 172. Accordingly, the soft AP 134 may receive from the CSCF 152 a SIP message (e.g., INVITE) originated from the IMS UE 178 to be routed to the IMS STA 172.

When the SIP messages are not encrypted, the IMS RRM 734 may monitor or intercept the SIP messages received at the soft AP 134, and determine whether the soft AP 134 should further route the SIP messages based on an admission policy configured at the IMS RRM 734. Specifically, the IMS RRM 734 may monitor, among others, signaling messages regarding INVITE, IMS session establishment, real time functions, and/or mid-call upgrade/downgrade scenarios. As an example, the admission policy may specify one or more of:

(1) the number of IMS STAs 172 that can be associated with the soft AP 134 concurrently (e.g., via a NUMBER_OF_USER_ON_SOFTAP parameter);

(2) the number of IMS applications using VoIP that can be supported by the soft AP 134 concurrently (e.g., via a NUMBER_OF_IMS_USER_ON_SOFTAP_WITH_VOIP parameter);

(3) the number of IMS applications using RCS only that can be supported by the soft AP 134 concurrently (e.g., via a NUMBER_OF_IMS_USER_ON_SOFTAP_WITH_RCS_ONLY parameter); and (4) the number of IMS sessions that can be supported by the soft AP 134 concurrently (e.g., via a NUMBER_OF_IMS_SESSIONS_ON_SOFTAP parameter).

Further, the admission policy may define control admission of IMS services based on the category (type) of IMS services. For example, VT and VoIP may be considered as in the same category. Accordingly, the admission policy may specify the number of allowed VoIP and VT calls as shown in the below Table (A).

TABLE (A)

| Number of simultaneous VoIP calls allowed | Number of simultaneous VT calls allowed |
|---|---|
| 0 | 2 |
| 1 | 1 |
| 2 | 1 |
| 3 or more | 0 |

The parameters specified by the admission policy may be statically configured initially and may be adjusted empirically. For example, these parameters may be determined based by the IMS RRM 734 based on channel conditions such as the QoS parameters of the EPS bearers that are established for the UE 102 by the QoS function 711 and the WWAN protocol stack 713 on the LTE link 139.

Further, the soft AP 134 may keep a record of all the IMS services that have be admitted by the soft AP 134. When the soft AP 134 receives a new SIP message requesting a new IMS service or a modification of an existing IMS service, the IMS RRM 734 may determine whether to route the SIP message based on the number of IMS services currently admitted and the admission policy, for example.

In one technique, the IMS RRM 734 may inspect an IMS communication service identifier (ICSI) of the received SIP message (e.g., INVITE/Re-INVITE/UPDATE) and determine, based on the ICSI, the particular IMS service that the IMS STA 172 attempts to use via the soft AP 134. The IMS RRM 734 may determine whether the SIP message requesting the particular IMS service should be routed by the soft AP 134 based on the limitations set by the admission policy for the particular IMS service. In an example, an IMS STA 172 may send a first SIP message requesting an RCS IMS service. An IMS UE 178 may send a second SIP message requesting a VoIP IMS service with one of the IMS STAs 172. The IMS RRM 734 may determine that the RCS IMS services supported by the soft AP 134 have reached the limit (e.g., the number of the RCS IMS services is equal to the NUMBER_OF_IMS_USER_ON_SOFTAP_WITH_RCS_ONLY parameter) set by the admission policy and may instruct the soft AP 134 not to further route the first SIP message originated from the IMS STA 172.

The IMS RRM 734 may determine that the VoIP IMS services supported by the soft AP 134 have not reached the limit (e.g., the number of the VoIP IMS services is less than the NUMBER_OF_IMS_USER_ON_SOFTAP_WITH_VOIP parameter) set by the admission policy and may instruct the soft AP 134 to further route the second SIP message originated from the IMS UE 178.

In another technique, the IMS RRM 734 may intercept a SIP message received at the soft AP 134 and may inspect a type parameter (e.g., the "m=" session description protocol (SDP) parameter) of the received SIP message (e.g., INVITE/Re-INVITE/UPDATE) to determine the type of the particular IMS service that the IMS STA 172 attempts to use via the soft AP 134. For example, the type may be audio or video. The IMS RRM 734 may determine whether the SIP message requesting the particular IMS service should be routed by the soft AP 134 based on the limitations set by the admission policy for the type of the particular IMS service.

When the IMS RRM 734 determines that a SIP message should not be further routed by the soft AP 134, the IMS RRM 734 may instruct the soft AP 134 to send a SIP response message to the requester (e.g., the IMS STA 172 or the IMS UE 178). The SIP response message may include a cause code of 503 to indicate that the service unavailable. The SIP response message may indicate to the requester that the server is undergoing maintenance or is temporarily overloaded and so cannot process the request. The SIP response message may also include a Retry-After header field that may specify when the requester may reattempt its request.

When the IMS RRM 734 determines that a SIP message should be further routed by the soft AP 134, the IMS RRM 734 may instruct the soft AP 134 to further route the SIP message. Accordingly, the soft AP 134 sends the SIP message to the NAT function 736 and/or the IMS ALG 737, which may translate of the IP address/port of the SIP message of the WLAN to an IP address/port of the WWAN. Then the NAT function 736 and/or the IMS ALG 737 send the SIP message to the WWAN protocol stack 713 through the communication interface 715. The WWAN protocol stack 713 then transmits the SIP message to the CSCF 152 on an EPS bearer established on the LTE link 139 and the links connecting the eNB 106, the serving gateway 116, and the PDN gateway 118.

Further, if a particular IMS service requested by an IMS UE 178 and directed to an IMS STA 172 is to be blocked, the IMS RRM 734 may send to the requesting IMS UE 178 a SIP message including a cause code of 403, which indicates that the request is forbidden.

Further, the IMS RRM 734 may request the QoS function 711 and the WWAN protocol stack 713 to establish one or more EPS bearers with sufficient QoS requirements to support one or more IMS services that are used by the IMS STAs 172 through the soft AP 134. For example, after the IMS STA 172 responds to the second SIP message for the IMS UE 178 requesting an VoIP IMS service and establishes an IMS session with the IMS UE 178, the soft AP 134 may, through the WWAN protocol stack 713, send the VoIP data flow on an EPS bearer established with sufficient QoS requirements to the IP services 122, which routes the VoIP data flow to the EPC 190. The EPC 190 then sends the VoIP data flow to the IMS UE 178 via the E-UTRAN 194.

In certain configurations, the IMS RRM 734 may be configured to handle IMS supplementary services. For example, in certain circumstances, a first IMS STA 172, through the soft AP 134 on the UE 102, may be in an IMS VoIP call with a first IMS UE 178 on a first EPS bearer. The soft AP 134 may receive an SIP message from a second IMS UE 178 requesting to initiate an IMS VoIP call with the first IMS STA 172. The IMS RRM 734 may determine that the SIP message is for an IMS supplementary service (e.g., call holding) and is not for a new IMS VoIP service, as the first IMS STA 172 is already on a call. The IMS RRM 734 may determine that an IMS supplementary service may not be subject to the admission policy. The IMS RRM 734 instructs the soft AP 134 to route the SIP message to the first IMS STA 172. The first IMS STA 172 may send SIP message to the soft AP 134 indicating that the IMS STA 172 requests to answer the call from the second IMS UE 178 and put the call with the first IMS UE 178 on hold. The IMS RRM 734 intercepts the SIP message and may decide to send a modified SIP message to the CSCF 152. The modified SIP message indicates that the IMS STA 172 requests to answer the call from the second IMS UE 178 but does not request the IMS system 150 to put on hold the existing call between the first IMS STA 172 and the first IMS UE 178. The IMS RRM 734 instructs the QoS function 711 and the WWAN protocol stack 713 to establish a new, second EPS bearer or allocate an existing, second EPS bearer for the call between the first IMS STA 172 and the first IMS UE 178. The IMS RRM 734 requests the soft AP 134 to maintain the first EPS bearer and to send on-hold music data on that EPS bearer to the first IMS UE 178, which is on hold. The IMS RRM 734 instructs the soft AP 134 to transport the call data between the first IMS STA 172 and the second IMS UE 178 on the second EPS bearer.

In certain circumstances, the soft AP 134 may receive two SIP messages from first and second IMS UEs 178 requesting a three-way-calling VoIP IMS service. The IMS RRM 734 may determine that the three-way-calling VoIP IMS service only requires one EPS bearer. Accordingly, the IMS RRM 734 may determine whether one additional VoIP IMS service may be admitted based on the admission policy. If the three-way-calling VoIP IMS service can be admitted based on the admission policy, the soft AP 134 accordingly requests the QoS function 711 and the WWAN protocol stack 713 to establish an EPS bearer for the three-way-calling VoIP IMS service.

In certain circumstances, a first IMS STA 172, through the soft AP 134 on the UE 102, may be in an IMS VoIP call with a first IMS UE 178 on a first EPS bearer. The soft AP 134 may receive an SIP message from a second IMS UE 178 requesting to join the call between the first IMS STA 172 and the first IMS UE 178 (i.e., a conference call). The IMS RRM 734 may determine that the SIP message is for an IMS supplementary service (i.e., conference call) and is not for a new IMS VoIP service, as the first IMS STA 172 is already on the call that is to be operated as a conference call. The IMS RRM 734 may determine that an IMS supplementary service may not be subject to the admission policy. Accordingly, the soft AP 134 may request the QoS function 711 and the WWAN protocol stack 713 to establish a second EPS bearer for a brief time. The call between the first IMS STA 172 and the second IMS UE 178 initially may be transported on the second EPS bearer. Subsequently, the IMS system 150 may merge the two calls and directs the merged call to be transported on one of the first EPS bearer and the second EPS bearer. The EPS bearer that is not used to transport the merged call may be removed.

As described supra, the IMS RRM 734 may be configured to not perform admission control for IMS supplementary services as independent calls. With IMS supplementary services, there may be multiple calls initially to a particular IMS STA 172 in a transient state. Nonetheless, the multiple calls subsequently may be coalesced into a single call and may not require additional EPS bearers to support the multiple calls.

In certain configurations, the SIP messages received at the soft AP 134 on the UE 102 may be encrypted (e.g., in accordance with Internet protocol security protocol (IPsec)). Thus, the IMS RRM 734 may not be able to look into the signaling messages to determine the requested IMS services. Therefore, the IMS RRM 734 may instruct the soft AP 134 to further route the encrypted SIP messages. The IMS STAs 172 may accordingly use IMS services via the soft AP 134. The IMS RRM 734 may determine whether a particular IMS STA 172 has established an IMS service based on a Wi-Fi Multimedia (WMM) access category (i.e., WMM profile) used on the WLAN link 138 between the particular IMS STA 172 and the soft AP 134. The WMM defines four access categories, i.e., voice (AC_VO), video (AC_VI), best effort data (AC_BE), and background data (AC_BK). The soft AP 134 uses AC_VO to handle voice IMS service data flow to/from the particular IMS STA 172. The soft AP 134 uses AC_VI to handle video IMS service data flow to/from the particular IMS STA 172. Thus, the IMS RRM 734 may used the WMM access categories associated with the data flows to determine number of the voice and video IMS services that have been admitted by the soft AP 134. If the number of admitted voice or video IMS services exceeds the limitation set by the admission policy, the IMS RRM 734 may instruct the soft AP 134 to select a voice or video IMS service (e.g., the most recently admitted one) and cause a denial-of-service to the selected IMS service (e.g., by blocking the data flow). Subsequently, the selected IMS service may be released by the IMS STA 172.

Thus, the IMS RRM 734 can control the number of admitted video and voice IMS services based on WMM profiles. In one example, the soft AP 134 can build a state machine based on the activity of certain WMM access categories. When the voice or video packets are exchanged, the access categories are mapped to the AC_VO or AC_VI. Thus, the IMS RRM 734 can detect that the voice or video IMS services are ongoing. For data packets received from the LTE link 139 and directed to an IMS STA 172, the IMS RRM 734 can similar inspect the differentiated services code point (DSCP) values of the data packets and determine whether the data packets belongs to a voice or video data flow. As such, the IMS RRM 734 can also determine whether a voice or video IMS service is ongoing on the LTE link 139.

When a voice or video IMS service for a particular IMS STA 172 is terminated, there will no more packets with AC_VO or AC_VI on the WLAN link 138 between the soft AP 134 and the soft AP 134. Thus, after a period in which the IMS RRM 734 only detect packets with AC_BE and AC_BC on the WLAN link 138, the IMS RRM 734 can determine that the voice or video IMS service on the WLAN link 138 has been terminated.

In certain configurations, the UE 102 may support connected mode discontinuous reception (CDRX) mechanism, which allows the UE 102 to make signaling-free transitions between sleep and awake states. The UE 102 may also support semi-persistent scheduling (SPS). To allow for shorter end-to-end delays, the IMS RRM 734 may request the modem processor 710 to disable CDRX and SPS features when the soft AP 134 handles two or more IMS services (e.g., VoIP or VT). When more than one IMS services (e.g., VoIP or VT) are established with the UE 102, the EPC 110 may need to appropriately grant the QoS required for multiple IMS services. In this scenario, the eNB 106 can choose to turn off all the RAN features (including CDRX and SPS) of the UE 102.

Further, the IMS RRM 734 may obtain service specific access control (SSAC) information from the WWAN protocol stack 713. When the SIP messages received at the soft AP 134 are not encrypted, the IMS RRM 734 may inspect the SIP message and determine the requested IMS service. The IMS RRM 734 may determine whether to further route the SIP message based on whether the requested IMS service is a service to be restricted or blocked in accordance with the SSAC information.

In certain configurations, the QoS function 711 and the WWAN protocol stack 713 may detect explicit congestion notification (ECN) in the IP headers of the DL packets received on the LTE link 139. The IMS RRM 734 may obtain the ECN from the QoS function 711 and the LTE link 139, and may take appropriate actions. For example, the IMS RRM 734 can selectively drop packets. In an example, the IMS RRM 734 can obtain the port numbers of the ports at the IMS STA 172 that are used for video and audio. The IMS RRM 734 may then instruct the soft AP 134 to, for example, drop all video packets and forward only audio packets.

Figure 9:
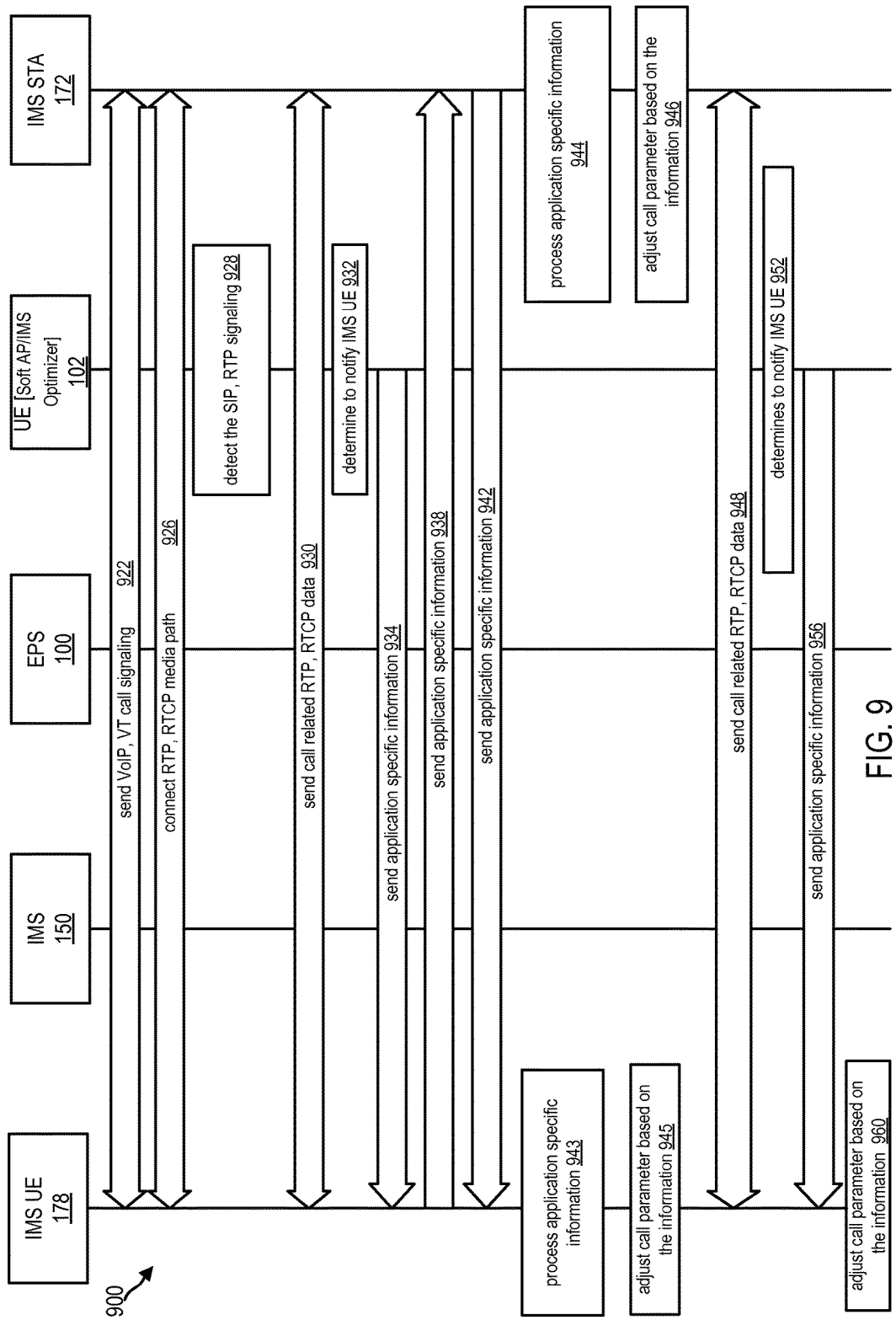
FIG. 9 is a diagram illustrating a sequence for managing IMS service parameters at an IMS UE and an IMS STA.

FIG. 9 is a diagram 900 illustrating a sequence for managing IMS service parameters at an IMS UE and an IMS STA. In this example, at operation 922, an IMS STA 172 may exchange, via the UE 102, the EPS 100, the IMS system 150, SIP messages for establishing an IMS service (e.g., VoIP, VT) with an IMS UE 178. At operation 926, upon successfully setting up an IMS session based on the SIP messages, the IMS STA 172 may utilize the IMS media function 897 to setup a media path with the IMS UE 178 through the UE 102 and the EPS 100, by using a selected transport protocol. In this example, the media path uses RTP/RTCP protocols. At operation 928, the IMS optimizer 735 may obtain the SIP messages and/or the RTP messages from the soft AP 134 and inspect the SIP messages and/or the RTP messages to determine the IP address of the IMS UE 178 and port number used by the IMS UE 178 to receive RTP data flow. The IMS manager 136 of the UE 102 may optionally negotiate a separate synchronization source (SSRC) identifier for the IMS optimizer 735.

At operation 930, the IMS STA 172 and the IMS UE 178 send IMS service data (e.g., VoIP, VT) to each other via the UE 102 and the EPS 100. At operation 932, the IMS optimizer 735 may determine to notify the IMS UE 178 that the IMS STA 172 is accessing a WWAN link via a soft AP. In this example, the IMS STA 172 and the IMS UE 178 each may use a particular RTCP application to control the media path. At operation 934, the IMS optimizer 735 may send an application layer message (i.e., application specific information) such as an RTCP application message (e.g., an RTCP APP message), based on the determined IP address and port number, to the IMS UE 178 to notify the IMS UE 178 that the IMS STA 172 is accessing a WWAN link via a soft AP. Alternatively the IMS Optimizer 735 may send an application layer message (i.e., application specific information) such as an RTCP application message (e.g., an RTCP APP message), based on the determined IP address and port number, to the IMS STA 172 to notify the IMS STA 172 that the IMS STA 172 is accessing a WWAN link via a soft AP Based on this message IMS STA 172 may send an application layer message (i.e., application specific information) such as an RTCP application message (e.g., an RTCP APP message), to the IMS UE 178 to notify the IMS UE 178 that the IMS STA 172 is accessing a WWAN link via a soft AP. The application layer message may also include RAT information and IMS service environment specific information at the UE 102 (e.g., EPS bearer related). The IMS optimizer 735 later may notify the IMS UE 178 or the IMS STA 172 in case any of the EPS bearer related information changes. At operation 938, the IMS UE 178 may send an application layer message (i.e., application specific information) such as an RTCP application message (e.g., an RTCP APP message) to the IMS STA 172 to notify the IMS STA 172 that the IMS STA 172 is accessing a WWAN link via a soft AP. The application layer message may also include RAT information and IMS service environment specific information at the IMS UE 178. At operation 942, the IMS STA 172 may send an application layer message (i.e., application specific information) such as an RTCP application message (e.g., an RTCP APP message) to the IMS UE 178. The application layer message may also include RAT information and IMS service environment specific information at the IMS STA 172.

At operation 943, the IMS UE 178 processes the received RAT information and IMS service environment specific information corresponding to the IMS STA 172 and the UE 102. At operation 945, the IMS UE 178 may adjust the IMS service parameters such as dejitter buffers, redundancy, etc. accordingly. For example, after learning that the IMS STA 172 is accessing an LTE link, the IMS UE 178 may determine that the jitter and delay are less than those for a WLAN link. Thus, the IMS UE 178 may reduce the upper limit of the dejitter buffer to improve end to end voice packet delays. The IMS UE 178 may also determine that packet redundancy, bundling, etc. may not be necessary and accordingly apply these functions At operation 944, the IMS STA 172 processes the received RAT information and IMS service environment specific information corresponding to the IMS UE 178 and the UE 102. At operation 946, the IMS STA 172 determines that the soft AP 134 is operating on an LTE link if such a determination was not made prior to the receipt of message in operation 942. The IMS STA 172 may adjust the IMS service parameters such as dejitter buffers, redundancy, etc. accordingly. Further, the IMS STA 172 may further adjust the IMS service parameters based on the received RAT information and IMS service environment specific information at the IMS UE 178 and the UE 102. For example, after learning that the IMS STA 172 is accessing an LTE link, the IMS UE 178 may determine that the jitter and delay are less than those for a WLAN link. Thus, the IMS STA 172 may reduce the upper limit of the dejitter buffer. The IMS STA 172 may also determine that packet redundancy, bundling, etc. may not be necessary.

After adjusting the IMS service parameters, at operation 948, the IMS STA 172 and the IMS UE 178 send IMS service data (e.g., VoIP, VT) to each other via the UE 102 and the EPS 100.

Subsequently, at operation 952, the IMS optimizer 735 determines that the EPS bearer related information at the UE 102 has changed. The IMS optimizer 735 further determines to notify the IMS UE 178 about the change. At operation 956, the IMS optimizer 735 may send an application layer message (i.e., application specific information) such as an RTCP application message to the IMS UE 178 to notify the IMS UE 178 about the change. At operation 960, the IMS UE 178 may adjust the IMS service parameters such as dejitter buffers, redundancy, etc. accordingly.

Figure 10:
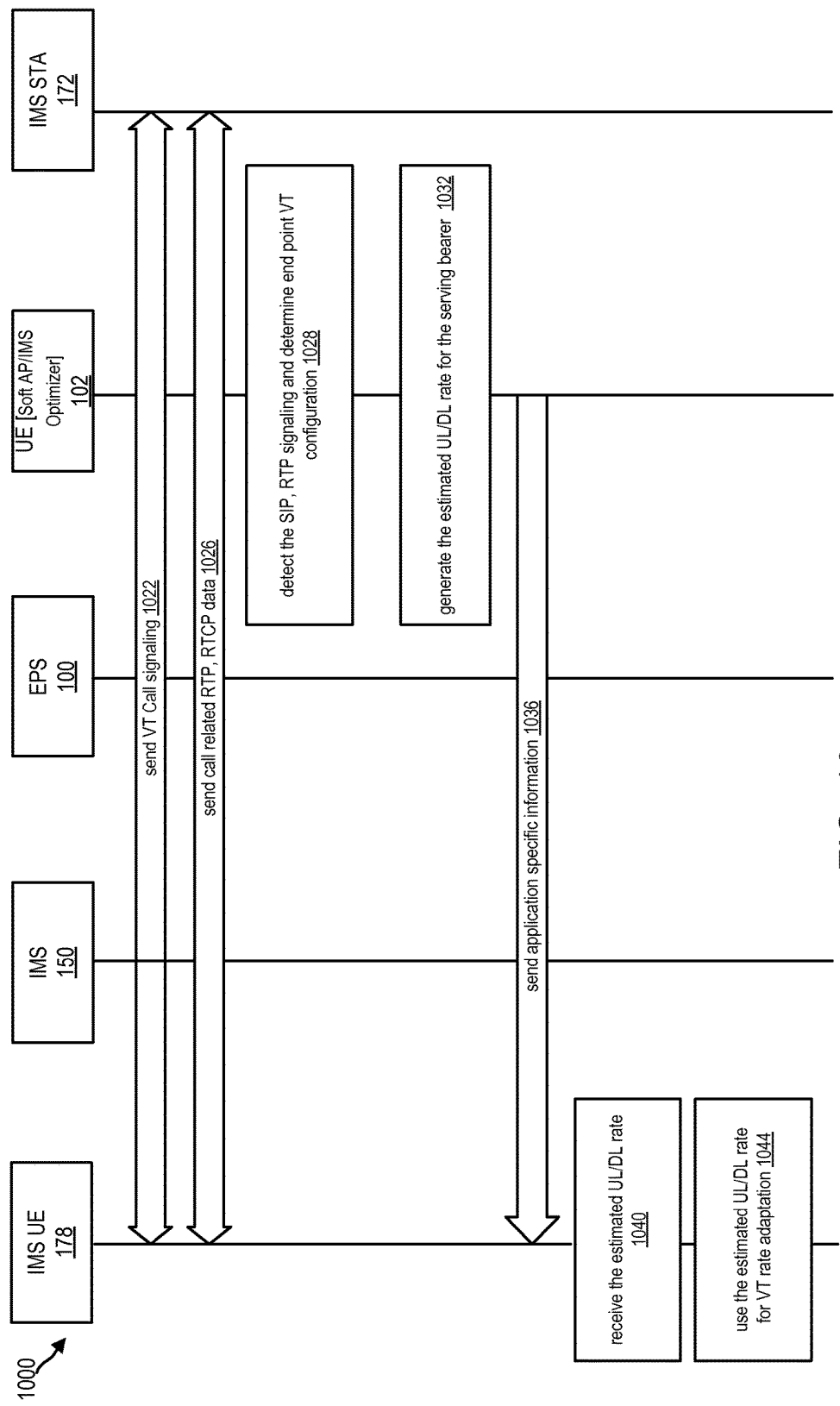
FIG. 10 is a diagram illustrating a sequence for managing IMS service rate adaptation parameters at an IMS UE and an IMS STA.

FIG. 10 is a diagram 1000 illustrating a sequence for managing IMS service rate adaptation parameters at an IMS UE and an IMS STA. In this example, at operation 1022, an IMS STA 172 may exchange, via the UE 102, the EPS 100, the IMS system 150, SIP messages for establishing an IMS service (e.g., VT) with an IMS UE 178. Upon the successfully setting up an IMS session based on the SIP messages, the IMS STA 172 may utilize the IMS media function 897 to setup a media path with the IMS UE 178 through the UE 102 and the EPS 100 by using a selected transport protocol. In this example, the media path uses RTP/RTCP protocols. At operation 1026, the IMS STA 172 and the IMS UE 178 send IMS service data (e.g., VT) to each other via the UE 102 and the EPS 100.

At operation 1028, the IMS optimizer 735 may obtain the SIP messages and/or the RTP messages from the soft AP 134 and inspect the SIP messages and/or the RTP messages to determine the IP address of the IMS UE 178 and port number used by the IMS UE 178 to receive RTP data flow. The IMS optimizer 735 may also determine VT configuration at the IMS UE 178. The IMS function at the UE 102 may optionally negotiate a separate synchronization source (SSRC) identifier for the IMS optimizer 735.

At operation 1032, the IMS optimizer 735 obtain from the QoS function 711 and the WWAN protocol stack 713 information regarding the EPS bearer established for transporting the IMS service (e.g., VT). The IMS optimizer 735 may generate the estimated UL and DL rates for the established EPS bearer used for the IMS service (e.g., VT). Further, in this example, the IMS STA 172 and the IMS UE 178 each may use a particular RTCP application to control the media path.

At operation 1036, the IMS optimizer 735 may send an application layer message (i.e., application specific information) such as an RTCP application message based on the determined IP address and port number, to the IMS UE 178 to notify the IMS UE 178 of the estimated UL and DL rates. Alternatively the IMS Optimizer 735 may send an application layer message (i.e., application specific information) such as an RTCP application message (e.g., an RTCP APP message), based on the determined IP address and port number, to the IMS STA 172 to notify the IMS STA 172 the estimated UL and DL rates offered via the soft AP. Based on this message, the IMS STA 172 may send an application layer message (i.e., application specific information) such as an RTCP application message (e.g., an RTCP APP message), to the IMS UE 178 to notify the IMS UE 178 regarding the estimated UL and DL rates offered to the IMS STA 172. At operation 1040, the IMS UE 178 receive the estimated UL and DL rates. At operation 1044, the IMS UE 178 may use the estimated UL and DL rates for VT rate adaptation at the IMS UE 178.

In certain configurations, the instant messenger application 838 and the file share application 839 on an IMS STA 172 may use message session relay protocol (MSRP) or HTTP/Web sockets protocols within IMS services. The IP address of the IMS STA 172 on the WLAN link 138 and carried in the MSRP and HTTP/Websockets packets may need to be translated to an IP address on the LTE link 139 by the NAT function 736 and the IMS ALG 737. The NAT function 736 and the IMS ALG 737 then send the packets with the translated IP address to WWAN protocol stack 713, which accordingly transmits the packets on the LTE link 139.

In certain configurations, the soft AP 134 and the IMS manager 136 of the UE 102 may handle Internet traffic based on offloading policies. The offloading policies may define that the UE 102 may not offload Internet traffic to WiFi while on the UE 102 is on macro (LTE/2G/3G) footprint. The UE 102 may offload Internet to WiFi only when the UE 102 is out of cellular footprint. Further, the offloading policies may define that the UE 102 may offload Internet traffic to operator trusted WiFi HotSpots only. Further, offloading policies may define that the UE 102 may offload Internet traffic to generic WiFi HotSpots only. Furthermore, the offloading policies may define that the UE 102 transport IMS and RCS only on LTE link, and the UE 102 may transport voice data over 2G/3G when the UE 102 is out of LTE footprint.

Figure 11:
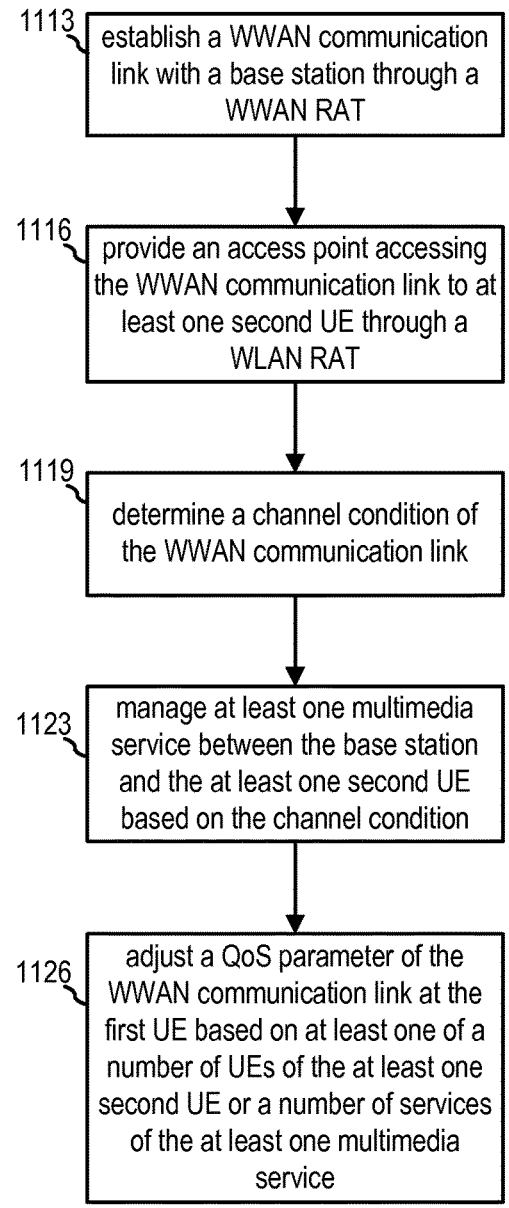
FIG. 11 is a flow chart of a method (process) of managing IMS services provided through a soft AP.

FIG. 11 is a flow chart 1100 of a method (process) of managing IMS services provided through a soft AP. The apparatus may be a UE (e.g., UE 102, the apparatus 2002/2002'). At operation 1113, the UE establishes a WWAN communication link with a base station through a WWAN RAT. At operation 1116, the UE provides an access point accessing the WWAN communication link to at least one second UE through a WLAN RAT. At operation 1119, the UE determines a channel condition of the WWAN communication link. At operation 1123, the UE manages at least one multimedia service between the base station and the at least one second UE based on the channel condition. In certain configurations, the at least one multimedia service includes an IMS service, a video telephony service, a rich communication service, or any combination thereof. In certain configurations, within the operation 1123, the UE, at operation 1126, adjusts a QoS parameter of the WWAN communication link at the first UE based on at least one of a number of UEs of the at least one second UE or a number of services of the at least one multimedia service. In certain configurations, the management of the at least one multimedia service includes managing internet traffic offloading. For example, referring to FIG. 9, the IMS optimizer 735 may intercept the SIP messages communicated between the IMS STA 172 and the IMS UE 178 and may accordingly manage the call parameters at the IMS STA 172 and the IMS UE 178.

Figure 12:
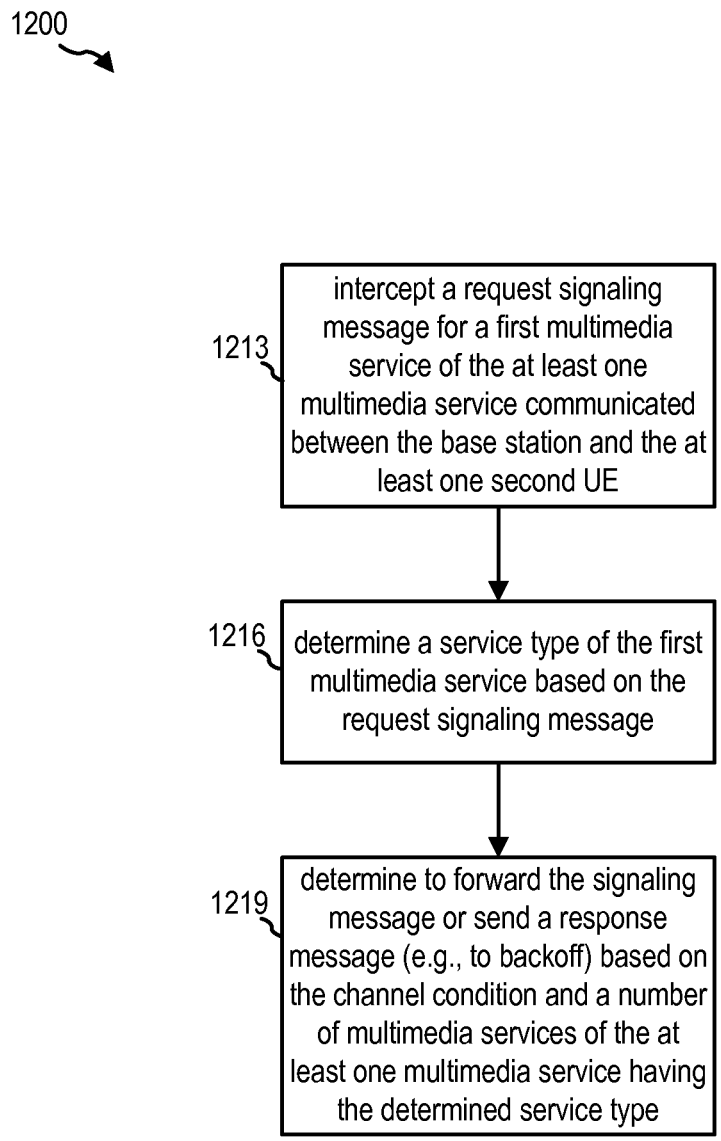
FIG. 12 is a flow chart of a first method (process) of managing at least one multimedia service between a base station and a UE based on a channel condition.

FIG. 12 is a flow chart 1200 of a first method (process) of managing at least one multimedia service between a base station and a UE based on a channel condition. The method may be performed within operation 1123 illustrated in FIG. 11. More specifically, at operation 1213, the UE intercepts a request signaling message for a first multimedia service of the at least one multimedia service communicated between the base station and the at least one second UE. The request signaling message indicates that the at least one second UE requests to join the first multimedia service. At operation 1216, the UE determines a service type of the first multimedia service based on the request signaling message. At operation 1219, the UE determines to forward the signaling message or send a response message (e.g., to back off) based on the channel condition and a number of multimedia services of the at least one multimedia service having the determined service type. In certain configurations, the response message includes a cause code for backoff. In certain configurations, the response message indicates a denial of service. For example, referring to FIG. 7, the IMS RRM 734 may determine the service type of VoIP and VT IMS services and manages VoIP and VT IMS services accordingly.

Figure 13:
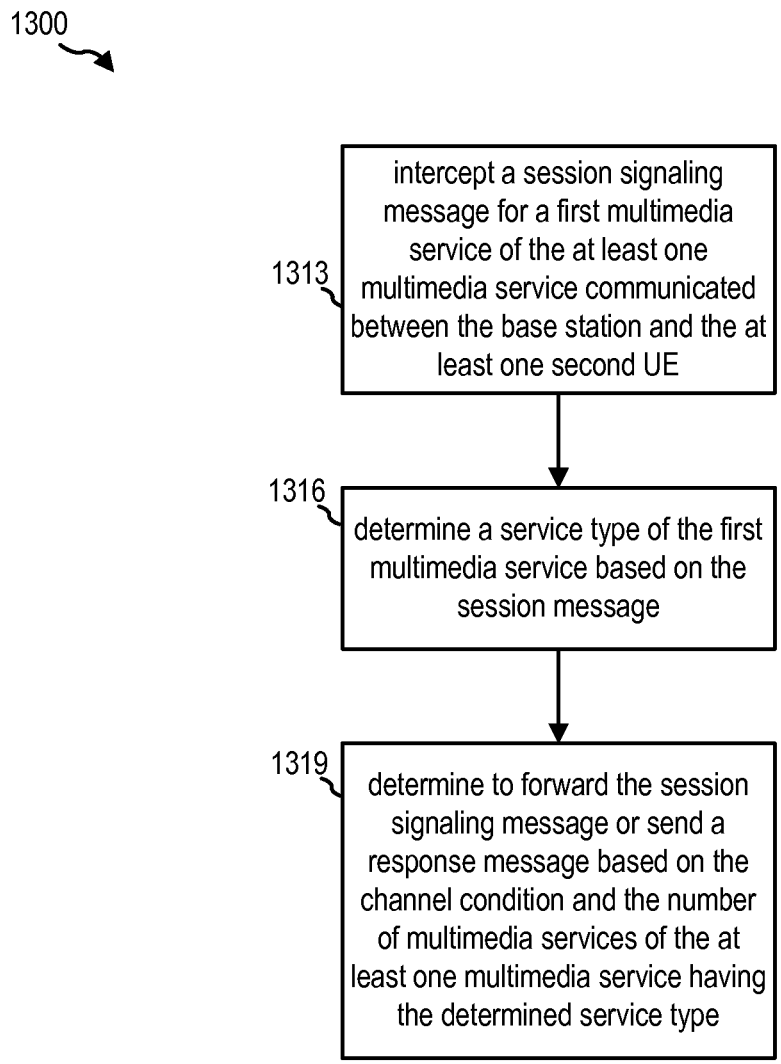
FIG. 13 is a flow chart of a second method (process) of managing at least one multimedia service between a base station and a UE based on a channel condition.

FIG. 13 is a flow chart 1300 of a second method (process) of managing at least one multimedia service between a base station and a UE based on a channel condition. The method may be performed within operation 1123 illustrated in FIG. 11. More specifically, at operation 1313, the UE intercepts a session signaling message for a first multimedia service of the at least one multimedia service communicated between the base station and the at least one second UE. At operation 1316, the UE a service type of the first multimedia service based on the session message. At operation 1319, the UE determines to forward the session signaling message or send a response message based on the channel condition and a number of multimedia services of the at least one multimedia service having the determined service type. For example, referring to FIG. 7, the IMS RRM 734 may intercept a SIP message received at the soft AP 134 and may inspect a type parameter (e.g., the "m=" session description protocol (SDP) parameter) of the received SIP message (e.g., INVITE/Re-INVITE/UPDATE) to determine the type of the particular IMS service that the IMS STA 172 attempts to use via the soft AP 134.

Figure 14:
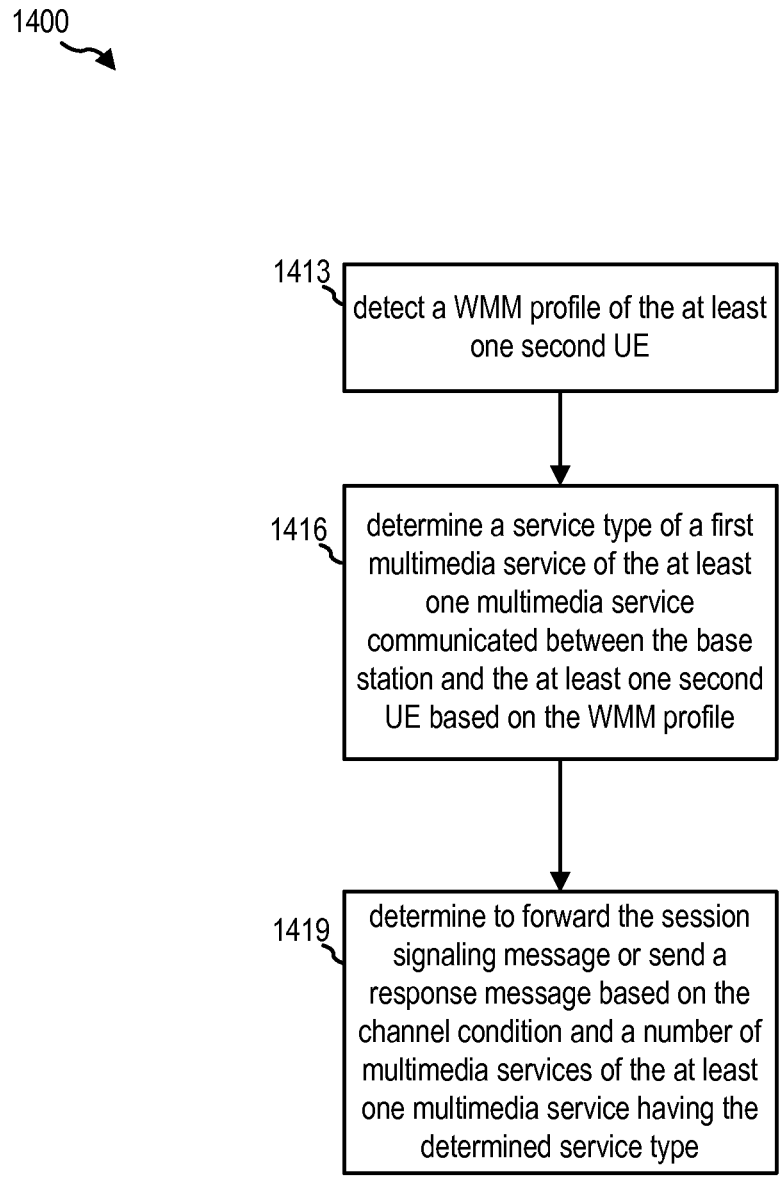
FIG. 14 is a flow chart of a third method (process) of managing at least one multimedia service between a base station and a UE based on a channel condition.

FIG. 14 is a flow chart 1400 of a third method (process) of managing at least one multimedia service between a base station and a UE based on a channel condition. The method may be performed within operation 1123 illustrated in FIG. 11. More specifically, at operation 1413, the UE detects the WiFiWMM profile of the at least one second UE. At operation 1416, the UE determines a service type of a first multimedia service of the at least one multimedia service communicated between the base station and the at least one second UE based on the WMM profile. At operation 1419, the UE determines to forward the session signaling message or send a response message based on the channel condition and a number of multimedia services of the at least one multimedia service having the determined service type. For example, referring to FIG. 7, the IMS RRM 734 may determine whether a particular IMS STA 172 has established an IMS service based on a Wi-Fi Multimedia (WMM) access category (i.e., WMM profile) used on the WLAN link 138 between the particular IMS STA 172 and the soft AP 134. The WMM defines four access categories, i.e., voice (AC_VO), video (AC_VI), best effort data (AC_BE), and background data (AC_BK). Thus, the IMS RRM 734 can control the number of admitted video and voice IMS services based on WMM profiles.

Figure 15:
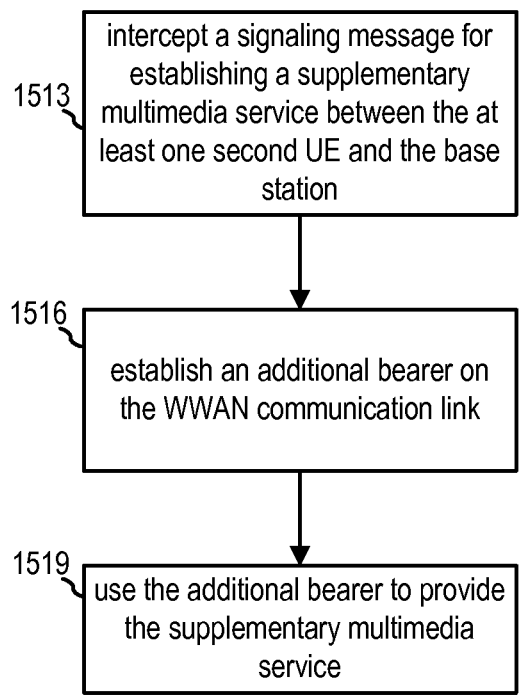
FIG. 15 is a flow chart of a fourth method (process) of managing at least one multimedia service between a base station and a UE based on a channel condition.

FIG. 15 is a flow chart 1500 of a fourth method (process) of managing at least one multimedia service between a base station and a UE based on a channel condition. The method may be performed within operation 1123 illustrated in FIG. 11. More specifically, at operation 1513, the UE intercepts a signaling message for establishing a supplementary multimedia service between the at least one second UE and the base station. At operation 1516, the UE establishes an additional bearer on the WWAN communication link. At operation 1519, the UE uses the additional bearer to provide the supplementary multimedia service. For example, referring to FIG. 7, the IMS RRM 734 may determine that the three-way-calling VoIP IMS service only requires one EPS bearer. Accordingly, the IMS RRM 734 may determine whether one additional VoIP IMS service may be admitted based on the admission policy. If the three-way-calling VoIP IMS service can be admitted based on the admission policy, the soft AP 134 accordingly requests the QoS function 711 and the WWAN protocol stack 713 to establish an EPS bearer for the three-way-calling VoIP IMS service.

Figure 16:
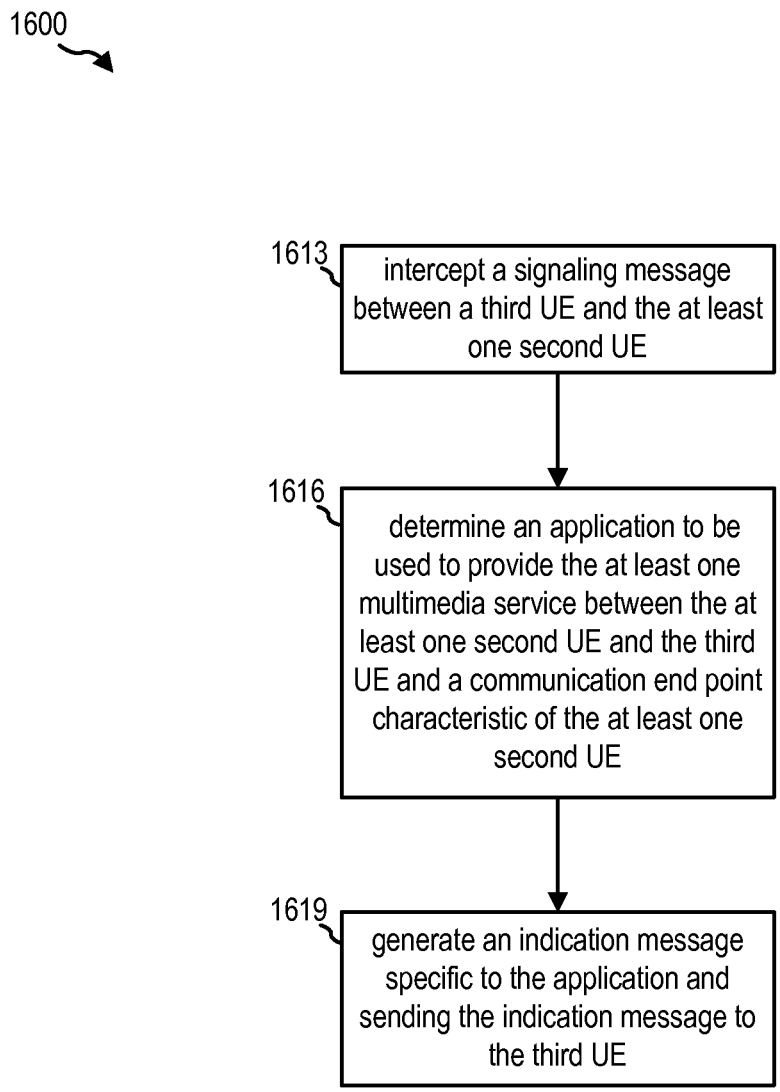
FIG. 16 is a flow chart of a fifth method (process) of managing at least one multimedia service between a base station and a UE based on a channel condition.

FIG. 16 is a flow chart 1600 of a fifth method (process) of managing at least one multimedia service between a base station and a UE based on a channel condition. The method may be performed within operation 1123 illustrated in FIG. 11. More specifically, at operation 1613, the UE intercepting a signaling message between a third UE and the at least one second UE. The first UE is in communication with the third UE through the WWAN communication link and the base station. At operation 1616, the UE determines an application to be used to provide the at least one multimedia service between the at least one second UE and the third UE and a communication end point characteristic of the at least one second UE. At operation 1619, the UE generates an indication message specific to the application and sending the indication message to the third UE. The indication message includes the communication end point characteristic of the at least one second UE and indicates that the at least one second UE is in communication with the WWAN communication link through the access point. For example, referring to FIG. 9, the IMS optimizer 735 may send an application layer message (i.e., application specific information) such as an RTCP application message, based on the determined IP address and port number, to the IMS UE 178 to notify the IMS UE 178 that the IMS STA 172 is accessing a WWAN link via a soft AP. The application layer message may also include RAT information and IMS service environment specific information at the UE 102 (e.g., EPS bearer related). The IMS optimizer 735 later may notify the IMS UE 178 in case any of the EPS bearer related information changes.

Figure 17:
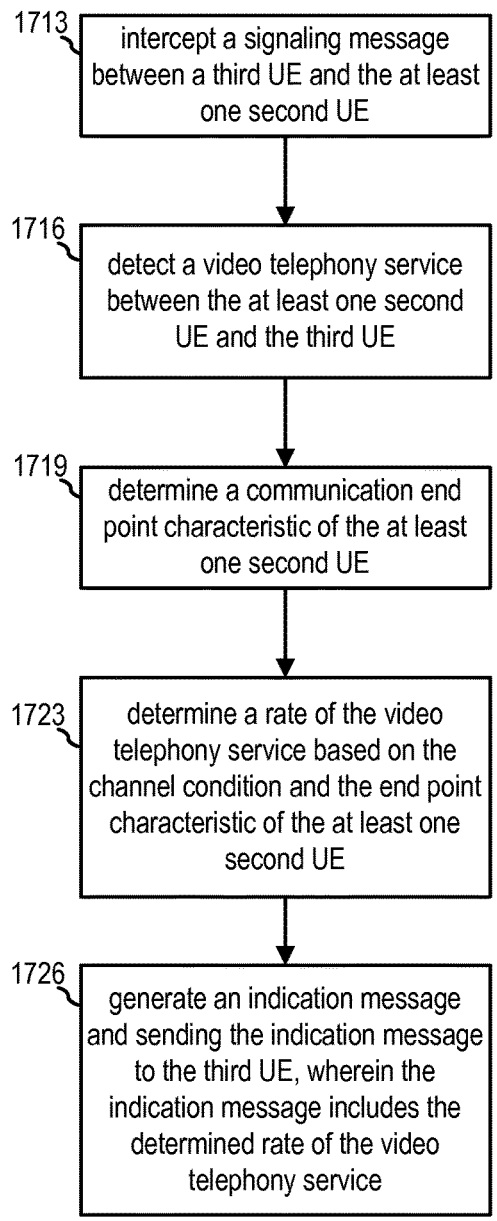
FIG. 17 is a flow chart of a sixth method (process) of managing at least one multimedia service between a base station and a UE based on a channel condition.

FIG. 17 is a flow chart 1700 of a sixth method (process) of managing at least one multimedia service between a base station and a UE based on a channel condition. The method may be performed within operation 1123 illustrated in FIG. 11. More specifically, at operation 1713, the UE intercepts a signaling message between a third UE and the at least one second UE. The first UE is in communication with the third UE through the WWAN communication link and the base station. At operation 1716, the UE detects a video telephony service between the at least one second UE and the third UE. At operation 1719, the UE determines a communication end point characteristic of the at least one second UE. At operation 1723, the UE determines a rate of the video telephony service based on the channel condition and the end point characteristic of the at least one second UE. At operation 1726, the UE generates an indication message and sends the indication message to the third UE. The indication message includes the determined rate of the video telephony service. For example, referring to FIG. 10, the IMS optimizer 735 obtain from the QoS function 711 and the WWAN protocol stack 713 information regarding the EPS bearer established for transporting the IMS service (e.g., VT). The IMS optimizer 735 may generate the estimated UL and DL rates for the established EPS bearer used for the IMS service (e.g., VT). The IMS optimizer 735 may send an application layer message (i.e., application specific information) such as an RTCP application message based on the determined IP address and port number, to the IMS UE 178 to notify the IMS UE 178 of the estimated UL and DL rates.

Figure 18:
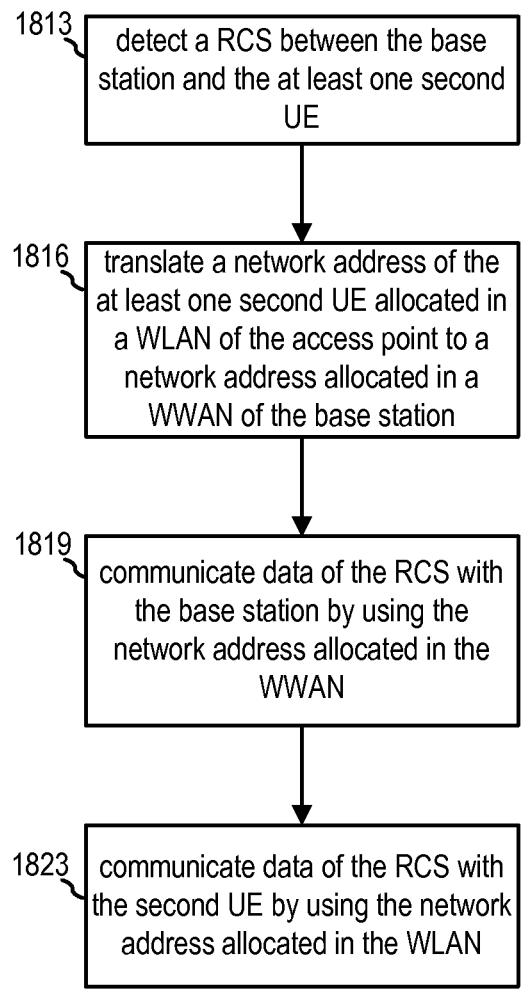
FIG. 18 is a flow chart of a seventh method (process) of managing at least one multimedia service between a base station and a UE based on a channel condition.

FIG. 18 is a flow chart 1800 of a seventh method (process) of managing at least one multimedia service between a base station and a UE based on a channel condition. The method may be performed within operation 1123 illustrated in FIG. 11. More specifically, at operation 1813, the UE detects a rich communication service between the base station and the at least one second UE. At operation 1816, the UE translates a network address of the at least one second UE allocated in a WLAN of the access point to a network address allocated in a WWAN of the base station. At operation 1819, the UE communicates data of the RCS with the base station by using the network address allocated in the WWAN. At operation 1823, the UE communicates data of the RCS with the second UE by using the network address allocated in the WLAN. In certain configurations, the translation is performed at an ALG provided by the access point. For example, referring to FIG. 7, the IP address of the IMS STA 172 on the WLAN link 138 and carried in the MSRP and HTTP/Websockets packets may need to be translated to an IP address on the LTE link 139 by the NAT function 736 and the IMS ALG 737. The NAT function 736 and the IMS ALG 737 then send the packets with the translated IP address to WWAN protocol stack 713, which accordingly transmits the packets on the LTE link 139.

Figure 19:
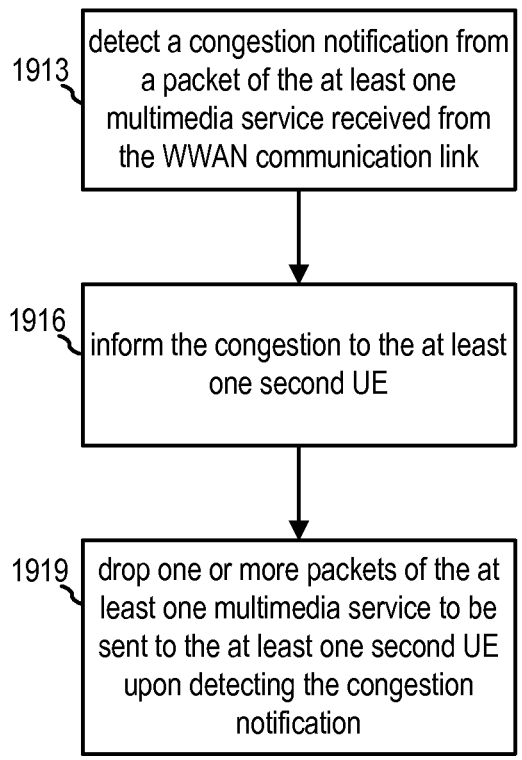
FIG. 19 is a flow chart of an eighth method (process) of managing at least one multimedia service between a base station and a UE based on a channel condition.

FIG. 19 is a flow chart 1900 of an eighth method (process) of managing at least one multimedia service between a base station and a UE based on a channel condition. The method may be performed within operation 1123 illustrated in FIG. 11. More specifically, at operation 1913, the UE detects a congestion notification from a packet of the at least one multimedia service received from the WWAN communication link. At operation 1916, the UE informs the congestion to the at least one second UE. In certain configurations, at operation 1919, the UE drops one or more packets of the at least one multimedia service to be sent to the at least one second UE upon detecting the congestion notification. For example, referring to FIG. 7, the IMS RRM 734 may obtain the ECN from the QoS function 711 and the LTE link 139, and may take appropriate actions. For example, the IMS RRM 734 can selectively drop packets. In an example, the IMS RRM 734 can obtain the port numbers of the ports at the IMS STA 172 that are used for video and audio. The IMS RRM 734 may then instruct the soft AP 134 to, for example, drop all video packets and forward only audio packets.

Figure 20:
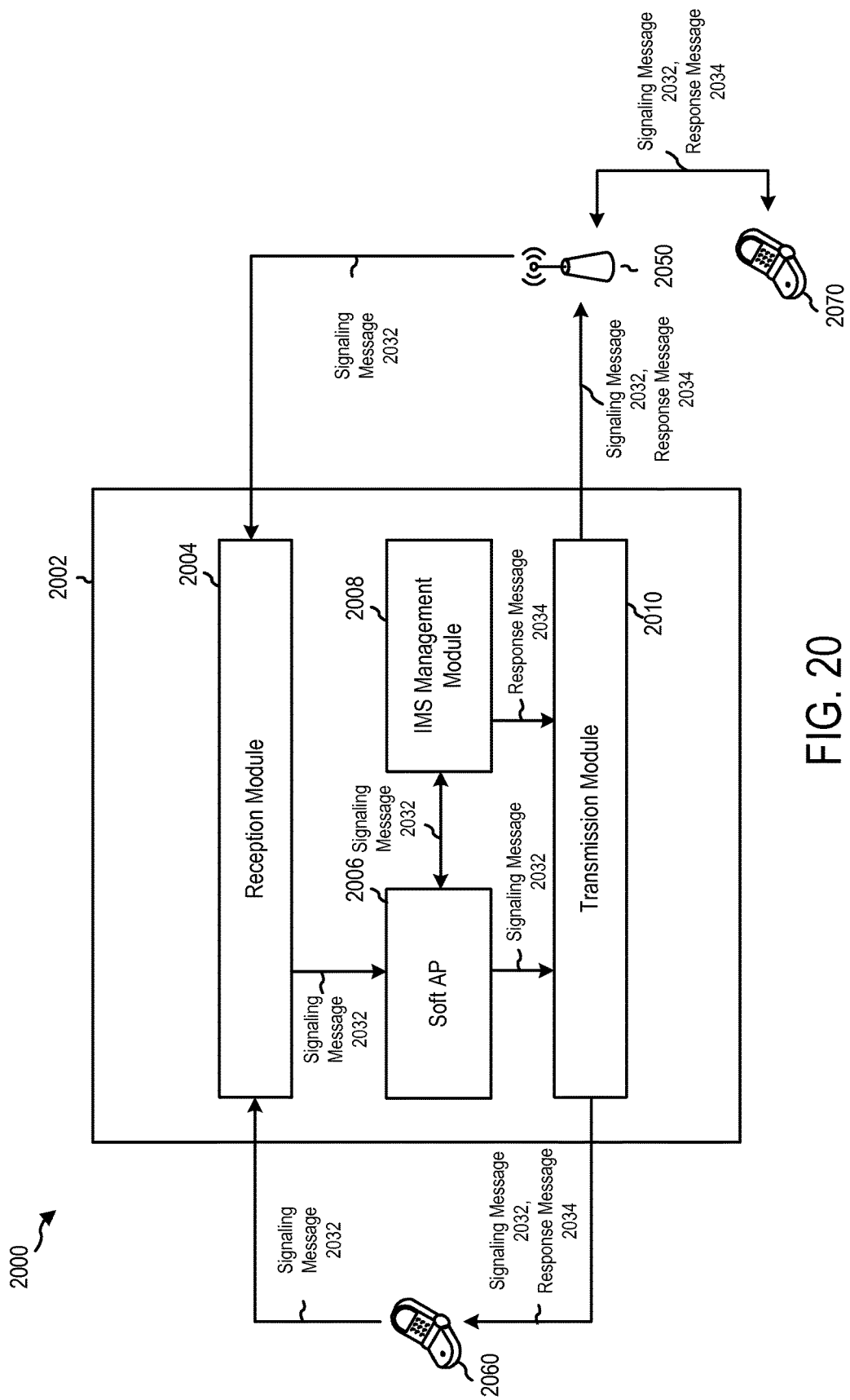
FIG. 20 is a conceptual data flow diagram illustrating the data flow between different modules/means/components in an exemplary apparatus.

FIG. 20 is a conceptual data flow diagram 2000 illustrating the data flow between different modules/means/components in an exemplary apparatus 2002. The apparatus may be a first UE. The apparatus includes a reception module 2004, a soft AP 2006, a IMS management module 2008, and a transmission module 2010.

In certain configurations, the reception module 2004 and/or the transmission module 2010 may be configured to establish a WWAN communication link with a eNB 2050 through a WWAN RAT. The soft AP 2006 may be configured to provide an access point accessing the WWAN communication link to at least one UE 2060 through a WLAN RAT. The IMS management module 2008 may be configured to determine a channel condition of the WWAN communication link. The IMS management module 2008 may be configured to manage at least one multimedia service between the eNB 2050 and the at least one UE 2060 based on the channel condition. In certain configurations, the at least one multimedia service includes an IMS service, a video telephony service, a rich communication service, or any combination thereof. In particular, the at least one UE 2060 may establish a multimedia service with a UE 2070 via the apparatus 2002 and the eNB 2050.

In certain configurations, the IMS management module 2008 may be configured to intercept a request signaling message 2032 for a first multimedia service of the at least one multimedia service communicated between the eNB 2050 and the at least one UE 2060. The request signaling message 2032 indicates that the at least one UE 2060 requests to join the first multimedia service. The IMS management module 2008 may be configured to determine a service type of the first multimedia service based on the request signaling message 2032. The IMS management module 2008 may be configured to determine to forward the signaling message 2032 or send a response message 2034 based on the channel condition and a number of multimedia services of the at least one multimedia service having the determined service type. In certain configurations, the response message 2034 includes a cause code for backoff. In certain configurations, the response message 2034 indicates a denial of service.

More specifically, when the IMS management module 2008 determines to forward the signaling message 2032, the IMS management module 2008 may allow or instruct the soft AP 2006 to route the signaling message 2032 to the intended recipient (e.g., the UE 2060, the UE 2070) of the signaling message 2032. Subsequently, the soft AP 2006 sends the signaling message 2032 to the transmission module 2010. The transmission module 2010 transmits the signaling message 2032 to the at least one UE 2060 if the at least one UE 2060 is the intended recipient. The transmission module 2010 sends the signaling message 2032 to the eNB 2050 if the UE 2070 is the intended recipient. Upon receiving the signaling message 2032, the eNB 2050 may route the signaling message 2032 toward the UE 2070.

When the IMS management module 2008 determines to send the response message 2034, the IMS management module 2008 may instruct the soft AP 2006 not to route the signaling message 2032 to the intended recipient (e.g., the UE 2060, the UE 2070) of the signaling message 2032. Subsequently, the IMS management module 2008 sends to the transmission module 2010 the response message 2034 addressed to the sender of the signaling message 2032. The transmission module 2010 transmits the response message 2034 to the at least one UE 2060 if the at least one UE 2060 is the sender. The transmission module 2010 sends the response message 2034 to the eNB 2050 if the UE 2070 is the sender. Upon receiving the response message 2034, the eNB 2050 may route the response message 2034 toward the UE 2070.

In certain configurations, the IMS management module 2008 may be configured to intercept a session signaling message 2032 for a first multimedia service of the at least one multimedia service communicated between the eNB 2050 and the at least one UE 2060. The IMS management module 2008 may be configured to determine a service type of the first multimedia service based on the session message. The IMS management module 2008 may be configured to determine to forward the session signaling message 2032 or send a response message 2034 based on the channel condition and a number of multimedia services of the at least one multimedia service having the determined service type. In certain configurations, the IMS management module 2008 may be configured to detect a WMM profile of the at least one UE 2060. the IMS management module 2008 may be configured to determine a service type of a first multimedia service of the at least one multimedia service communicated between the eNB 2050 and the at least one UE 2060 based on the WMM profile. the IMS management module 2008 may be configured to determine to forward the session signaling message 2032 or send a response message 2034 based on the channel condition and a number of multimedia services of the at least one multimedia service having the determined service type.

In certain configurations, the IMS management module 2008 may be configured to intercept a signaling message 2032 for establishing a supplementary multimedia service between the at least one UE 2060 and the eNB 2050. The reception module 2004 and/or the transmission module 2010 may be configured to establish an additional bearer on the WWAN communication link. The soft AP 2006 may be configured to use the additional bearer to provide the supplementary multimedia service. In certain configurations, the IMS management module 2008 may be configured to instruct the reception module 2004 and the transmission module 2010 to adjusting a QoS parameter of the WWAN communication link at the apparatus 2002 based on at least one of a number of UEs of the at least one UE 2060 or a number of services of the at least one multimedia service.

In certain configurations, the IMS management module 2008 may be configured to intercept a signaling message 2032 between a UE 2070 and the at least one UE 2060. The apparatus 2002 is in communication with the UE 2070 through the WWAN communication link and the eNB 2050. The IMS management module 2008 may be configured to determine an application to be used to provide the at least one multimedia service between the at least one UE 2060 and the UE 2070 and a communication end point characteristic of the at least one UE 2060. The IMS management module 2008 may be configured to generate an indication message specific to the application and sending the indication message to the UE 2070. The indication message includes the communication end point characteristic of the at least one UE 2060 and indicates that the at least one UE 2060 is in communication with the WWAN communication link through the access point.

In certain configurations, the IMS management module 2008 may be configured to intercept a signaling message 2032 between a UE 2070 and the at least one UE 2060. The apparatus 2002 is in communication with the UE 2070 through the WWAN communication link and the eNB 2050. The IMS management module 2008 may be configured to detect a video telephony service between the at least one UE 2060 and the UE 2070. The IMS management module 2008 may be configured to determine a communication end point characteristic of the at least one UE 2060. The reception module 2004 and/or the transmission module 2010 may be configured to determine a rate of the video telephony service based on the channel condition and the end point characteristic of the at least one UE 2060. The IMS management module 2008 may be configured to generate an indication message and sending the indication message to the UE 2070. The indication message includes the determined rate of the video telephony service.

In certain configurations, the IMS management module 2008 may be configured to detect a rich communication service between the eNB 2050 and the at least one UE 2060. The IMS management module 2008 may be configured to translate a network address of the at least one UE 2060 allocated in a WLAN of the access point to a network address allocated in a WWAN of the eNB 2050. The reception module 2004 and/or the transmission module 2010 may be configured to communicate data of the RCS with the eNB 2050 by using the network address allocated in the WWAN. The reception module 2004 and/or the transmission module 2010 may be configured to communicate data of the RCS with the UE 2060 by using the network address allocated in the WLAN. In certain configurations, the translation is performed at an application level gateway provided by the access point. In certain configurations, the IMS management module 2008 may be configured to detect a congestion notification from a packet of the at least one multimedia service received from the WWAN communication link. The IMS management module 2008 may be configured to inform the congestion to the at least one UE 2060. In certain configurations, the IMS management module 2008 may be configured to instruct the soft AP 2006 to drop one or more packets of the at least one multimedia service to be sent to the at least one UE 2060 upon detecting the congestion notification. In certain configurations, the IMS management module 2008 may be configured to manage internet traffic offloading.

The apparatus may include additional modules that perform each of the blocks of the algorithm in the aforementioned flowcharts of FIGS. 11-19. As such, each block in the aforementioned flowcharts of FIGS. 11-19 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
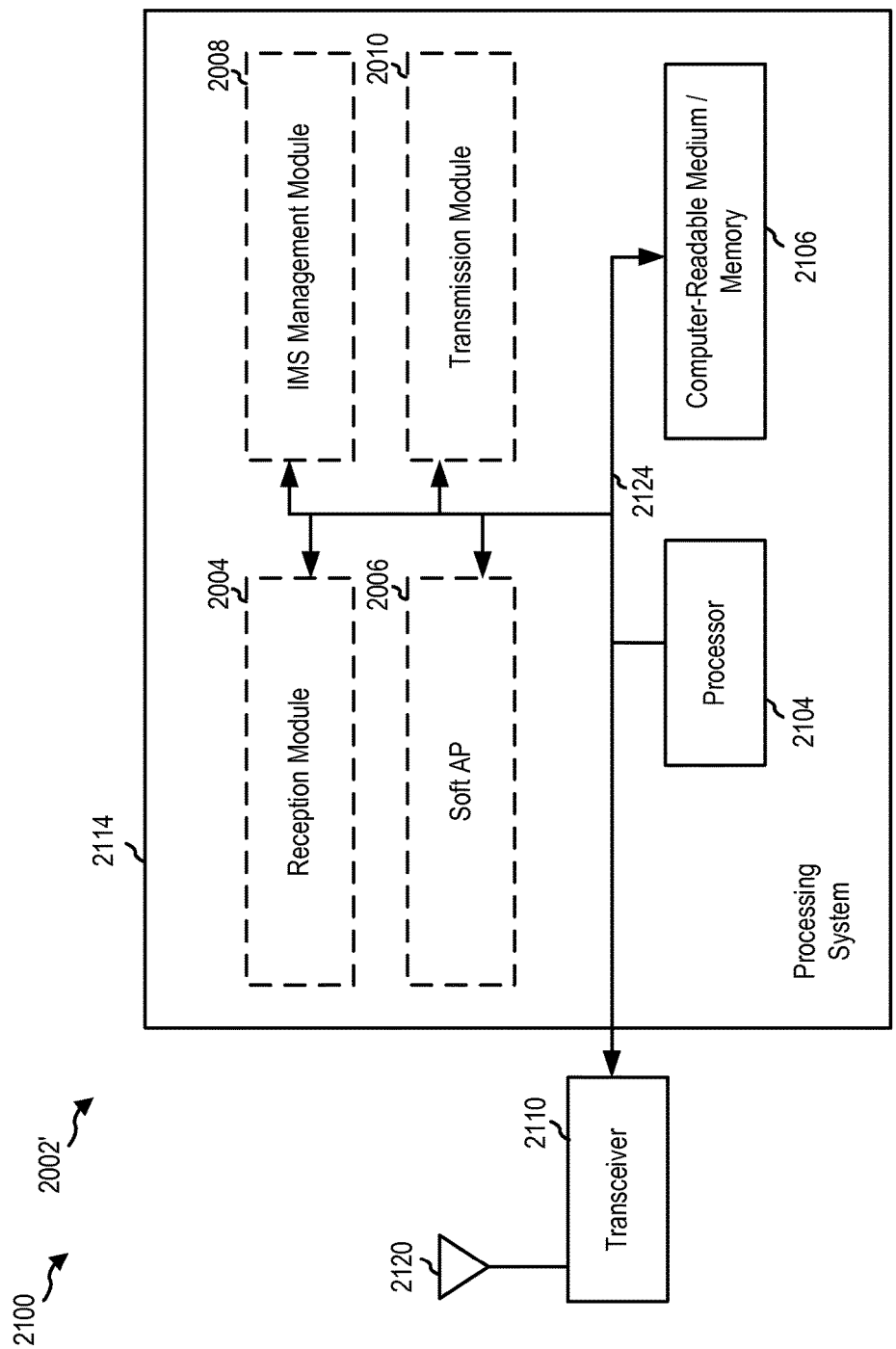
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 2004, 2006, 2008, 2010, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception module 2004. In addition, the transceiver 2110 receives information from the processing system 2114, specifically the transmission module 2010, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system further includes at least one of the modules 2004, 2006, 2008, and 2010. The modules may be software modules running in the processor 2104, resident/stored in the computer readable medium/memory 2106, one or more hardware modules coupled to the processor 2104, or some combination thereof. The processing system 2114 may be a component of the UE 650 and may include the memory 660 and/or at least one of the TX processor 668, the RX processor 656, and the controller/processor 659. The processing system 2114 may also include the modem processor 710, the application processor 730, and the memory 732. In one configuration, the apparatus 2002/2002' may be configured to include means for establishing a wireless wide area network (WWAN) communication link with a base station through a WWAN radio access technology (RAT). The apparatus 2002/2002' may be configured to include means for providing an access point accessing the WWAN communication link to at least one second UE through a wireless local area network (WLAN) RAT. The apparatus 2002/2002' may be configured to include means for determining a channel condition of the WWAN communication link. The apparatus 2002/2002' may be configured to include means for managing at least one multimedia service between the base station and the at least one second UE based on the channel condition.

In certain configurations, the at least one multimedia service includes an internet protocol (IP) multimedia subsystem (IMS) service, a video telephony service, a rich communication service (RCS), or any combination thereof. In certain configurations, the means for managing the at least one multimedia service is further configured to intercept a request signaling message for a first multimedia service of the at least one multimedia service communicated between the base station and the at least one second UE. The request signaling message indicates that the at least one second UE requests to join the first multimedia service. The means for managing the at least one multimedia service is further configured to determine a service type of the first multimedia service based on the request signaling message. The means for managing the at least one multimedia service is further configured to determine to forward the signaling message or send a response message based on the channel condition and a number of multimedia services of the at least one multimedia service having the determined service type.

In certain configurations, the response message includes a cause code for backoff. In certain configurations, the response message indicates a denial of service. In certain configurations, the means for managing the at least one multimedia service is further configured to intercept a session signaling message for a first multimedia service of the at least one multimedia service communicated between the base station and the at least one second UE. The means for managing the at least one multimedia service is further configured to determine a service type of the first multimedia service based on the session message. The means for managing the at least one multimedia service is further configured to determine to forward the session signaling message or send a response message based on the channel condition and a number of multimedia services of the at least one multimedia service having the determined service type. In certain configurations, the means for managing the at least one multimedia service is further configured to detect a wireless multimedia (WMM) profile of the at least one second UE. The means for managing the at least one multimedia service is further configured to determine a service type of a first multimedia service of the at least one multimedia service communicated between the base station and the at least one second UE based on the WMM profile. The means for managing the at least one multimedia service is further configured to determine to forward the session signaling message or send a response message based on the channel condition and a number of multimedia services of the at least one multimedia service having the determined service type. In certain configurations, the means for managing the at least one multimedia service is further configured to intercept a signaling message for establishing a supplementary multimedia service between the at least one second UE and the base station. The means for managing the at least one multimedia service is further configured to establish an additional bearer on the WWAN communication link. The means for managing the at least one multimedia service is further configured to use the additional bearer to provide the supplementary multimedia service.

In certain configurations, the means for managing the at least one multimedia service is further configured to adjust a quality of service (QoS) parameter of the WWAN communication link at the first UE based on at least one of a number of UEs of the at least one second UE or a number of services of the at least one multimedia service. In certain configurations, the means for managing the at least one multimedia service is further configured to intercept a signaling message between a third UE and the at least one second UE. The first UE is in communication with the third UE through the WWAN communication link and the base station. The means for managing the at least one multimedia service is further configured to determine an application to be used to provide the at least one multimedia service between the at least one second UE and the third UE and a communication end point characteristic of the at least one second UE. The means for managing the at least one multimedia service is further configured to generate an indication message specific to the application and sending the indication message to the third UE. The indication message includes the communication end point characteristic of the at least one second UE and indicates that the at least one second UE is in communication with the WWAN communication link through the access point. In certain configurations, the means for managing the at least one multimedia service is further configured to intercept a signaling message between a third UE and the at least one second UE. The first UE is in communication with the third UE through the WWAN communication link and the base station. The means for managing the at least one multimedia service is further configured to detect a video telephony service between the at least one second UE and the third UE. The means for managing the at least one multimedia service is further configured to determine a communication end point characteristic of the at least one second UE. The means for managing the at least one multimedia service is further configured to determine a rate of the video telephony service based on the channel condition and the end point characteristic of the at least one second UE. The means for managing the at least one multimedia service is further configured to generate an indication message and sending the indication message to the third UE. The indication message includes the determined rate of the video telephony service.

In certain configurations, the means for managing the at least one multimedia service is further configured to detect a rich communication service (RCS) between the base station and the at least one second UE. The means for managing the at least one multimedia service is further configured to translate a network address of the at least one second UE allocated in a WLAN of the access point to a network address allocated in a WWAN of the base station. The means for managing the at least one multimedia service is further configured to communicate data of the RCS with the base station by using the network address allocated in the WWAN. The means for managing the at least one multimedia service is further configured to communicate data of the RCS with the second UE by using the network address allocated in the WLAN. In certain configurations, the translation is performed at an application level gateway (ALG) provided by the access point. In certain configurations, the means for managing the at least one multimedia service is further configured to detect a congestion notification from a packet of the at least one multimedia service received from the WWAN communication link. The means for managing the at least one multimedia service is further configured to inform the congestion to the at least one second UE. In certain configurations, the means for managing the at least one multimedia service is further configured to drop one or more packets of the at least one multimedia service to be sent to the at least one second UE upon detecting the congestion notification. In certain configurations, the means for managing the at least one multimedia service is further configured to manage internet traffic offloading.

The aforementioned means may be one or more of the aforementioned modules of the apparatus 2002 and/or the processing system 2114 of the apparatus 2002' configured to perform the functions recited by the aforementioned means. As described supra, the processing system 2114 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means. The processing system 2114 may also include the modem processor 710, the application processor 730, and the memory 732.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first user equipment (UE), comprising:
   establishing a wireless wide area network (WWAN) communication link with a base station through a WWAN radio access technology (RAT);
   providing an access point accessing the WWAN communication link to at least one second UE through a wireless local area network (WLAN) RAT;
   determining a channel condition of the WWAN communication link; and
   managing at least one multimedia service between the base station and the at least one second UE based on the channel condition, wherein the managing the at least one multimedia service comprises:
   intercepting a message for a first multimedia service of the at least one multimedia service communicated between the base station and the at least one second UE; and
   determining to forward the message or to send a response message in response to the message based on at least the channel condition.

2. The method of claim 1, wherein the at least one multimedia service includes an Internet protocol (IP) multimedia subsystem (IMS) service, a video telephony service, a rich communication service (RCS), or any combination thereof.

3. The method of claim 1,
   the message comprises a request signaling message for the first multimedia service of the at least one multimedia service communicated between the base station and the at least one second UE;
   the request signaling message indicates that the at least one second UE requests to join the first multimedia service;

the managing the at least one multimedia service further comprises determining a service type of the first multimedia service based on the request signaling message; and the determining to forward the request signaling message or to send a response message is further based on a number of multimedia services of the at least one multimedia service having the determined service type.

4. The method of claim 3, wherein the response message includes a cause code for backoff.

5. The method of claim 3, wherein the response message indicates a denial of service.

6. The method of claim 1, wherein:

the message comprises a session signaling message for the first multimedia service of the at least one multimedia service communicated between the base station and the at least one second UE;

the managing the at least one multimedia service further comprises determining a service type of the first multimedia service based on the session signaling message; and the determining to forward the session signaling message or to send a response message is further based on the channel condition and a number of multimedia services of the at least one multimedia service having the determined service type.

7. The method of claim 1, wherein the managing the at least one multimedia service further includes:

intercepting a signaling message for establishing a supplementary multimedia service between the at least one second UE and the base station;

establishing an additional bearer on the WWAN communication link; and using the additional bearer to provide the supplementary multimedia service.

8. The method of claim 1, wherein the managing the at least one multimedia service further includes adjusting a quality of service (QoS) parameter of the WWAN communication link at the first UE based on at least one of a number of UEs of the at least one second UE or a number of services of the at least one multimedia service.

9. The method of claim 1, wherein the managing the at least one multimedia service further includes:

intercepting a signaling message between a third UE and the at least one second UE, wherein the first UE is in communication with the third UE through the WWAN communication link and the base station;

determining an application to be used to provide the at least one multimedia service between the at least one second UE and the third UE and a communication end point characteristic of the at least one second UE; and generating an indication message specific to the application and sending the indication message to the third UE, wherein the indication message includes the communication end point characteristic of the at least one second UE and indicates that the at least one second UE is in communication with the WWAN communication link through the access point.

10. The method of claim 1, wherein the managing the at least one multimedia service further includes:

intercepting a signaling message between a third UE and the at least one second UE, wherein the first UE is in communication with the third UE through the WWAN communication link and the base station;

detecting a video telephony service between the at least one second UE and the third UE;

determining a communication end point characteristic of the at least one second UE;

determining a rate of the video telephony service based on the channel condition and the end point characteristic of the at least one second UE; and generating an indication message and sending the indication message to the third UE, wherein the indication message includes the determined rate of the video telephony service.

11. The method of claim 1, wherein the managing the at least one multimedia service further includes:

detecting a rich communication service (RCS) between the base station and the at least one second UE;

translating a network address of the at least one second UE allocated in a WLAN of the access point to a network address allocated in a WWAN of the base station;

communicating data of the RCS with the base station by using the network address allocated in the WWAN; and communicating data of the RCS with the at least one second UE by using the network address allocated in the WLAN.

12. The method of claim 11, wherein the translation is performed at an application level gateway (ALG) provided by the access point.

13. The method of claim 1, wherein the managing the at least one multimedia service further includes:

detecting a congestion notification from a packet of the at least one multimedia service received from the WWAN communication link; and informing the congestion to the at least one second UE.

14. The method of claim 13, wherein the managing the at least one multimedia service further includes dropping one or more packets of the at least one multimedia service to be sent to the at least one second UE upon detecting the congestion notification.

15. The method of claim 1, wherein the managing the at least one multimedia service further includes managing internet traffic offloading.

16. An apparatus for wireless communication, the apparatus being a first UE, comprising:

means for establishing a wireless wide area network (WWAN) communication link with a base station through a WWAN radio access technology (RAT);

means for providing an access point accessing the WWAN communication link to at least one second UE through a wireless local area network (WLAN) RAT;

means for determining a channel condition of the WWAN communication link; and means for managing at least one multimedia service between the base station and the at least one second UE based on the channel condition, wherein the means for managing the at least one multimedia service is configured to:

intercept a message for a first multimedia service of the at least one multimedia service communicated service communicated between the base station and the at least one second UE; and determine to forward the message or to send a response message based on at least the channel condition.

17. The apparatus of claim 16, wherein the at least one multimedia service includes an Internet protocol (IP) multimedia subsystem (IMS) service, a video telephony service, a rich communication service (RCS), or any combination thereof.

18. The apparatus of claim 16, wherein:
the message comprises a request signaling message for the first multimedia service of the at least one multimedia service communicated between the base station and the at least one second UE:
the request signaling message indicates that the at least one second UE requests to join the first multimedia service;
the means for managing the at least one multimedia service further configured to determine a service type of the first multimedia service based on the request signaling message; and
to determine to forward the request signaling message or to send a response message is further based on a number of multimedia services of the at least one multimedia service having the determined service type.

19. The apparatus of claim 18, wherein the response message includes a cause code for backoff.

20. The apparatus of claim 18, wherein the response message indicates a denial of service.

21. The apparatus of claim 16, wherein:
the message comprises a session signaling message for the first multimedia service of the at least one multimedia service communicated between the base station and the at least one second UE;
the means for managing the at least one multimedia service is further configured to determine a service type of the first multimedia service based on the session signaling message; and
to determine to forward the session signaling message or to send a response message based on the a number of multimedia services of the at least one multimedia service having the determined service type.

22. The apparatus of claim 16, wherein the means for managing the at least one multimedia service is further configured to:
intercept a signaling message for establishing a supplementary multimedia service between the at least one second UE and the base station;
establish an additional bearer on the WWAN communication link; and
use the additional bearer to provide the supplementary multimedia service.

23. The apparatus of claim 16, wherein the means for managing the at least one multimedia service is further configured to adjust a quality of service (QoS) parameter of the WWAN communication link at the first UE based on at least one of a number of UEs of the at least one second UE or a number of services of the at least one multimedia service.

24. The apparatus of claim 16, wherein the means for managing the at least one multimedia service is further configured to:
intercept a signaling message between a third UE and the at least one second UE, wherein the first UE is in communication with the third UE through the WWAN communication link and the base station;
determine an application to be used to provide the at least one multimedia service between the at least one second UE and the third UE and a communication end point characteristic of the at least one second UE; and
generate an indication message specific to the application and sending the indication message to the third UE, wherein the indication message includes the communication end point characteristic of the at least one second UE and indicates that the at least one second UE is in communication with the WWAN communication link through the access point.

25. The apparatus of claim 16, wherein the means for managing the at least one multimedia service is further configured to:
detect a rich communication service (RCS) between the base station and the at least one second UE;
translate a network address of the at least one second UE allocated in a WLAN of the access point to a network address allocated in a WWAN of the base station;
communicate data of the RCS with the base station by using the network address allocated in the WWAN; and
communicate data of the RCS with the at least one second UE by using the network address allocated in the WLAN.

26. An apparatus for wireless communication, the apparatus being a first user equipment (UE), comprising:
a memory; and
at least one processor coupled to the memory and configured to:
establish a wireless wide area network (WWAN) communication link with a base station through a WWAN radio access technology (RAT);
provide an access point accessing the WWAN communication link to at least one second UE through a wireless local area network (WLAN) RAT;
determine a channel condition of the WWAN communication link; and
manage at least one multimedia service between the base station and the at least one second UE based on the channel condition by intercepting a message for a first multimedia service of the at least one multimedia service communicated between the base station and the at least one second UE, and determining to forward the message or send a response message based on at least the channel condition.

27. A non-transitory computer-readable medium storing computer executable code for wireless communication at a first user equipment (UE), comprising code for:
establishing a wireless wide area network (WWAN) communication link with a base station through a WWAN radio access technology (RAT);
providing an access point accessing the WWAN communication link to at least one second UE through a wireless local area network (WLAN) RAT;
determining a channel condition of the WWAN communication link; and
managing at least one multimedia service between the base station and the at least one second UE based on the channel condition, wherein the managing the at least one multimedia service comprises code for:
intercepting a message for a first multimedia service of the at least one multimedia service communicated between the base station and the at least one second UE; and
determining to forward the message or send a response message based on at least the channel condition.

28. A method of wireless communication of a first user equipment (UE), comprising:
establishing a wireless wide area network (WWAN) communication link with a base station through a WWAN radio access technology (RAT);
providing an access point accessing the WWAN communication link to at least one second UE through a wireless local area network (WLAN) RAT;
determining a channel condition of the WWAN communication link;

managing at least one multimedia service between the base station and the at least one second UE based on the channel condition, wherein the managing the at least one multimedia service comprises:
  detecting a wireless multimedia (WMM) profile of the at least one second UE;
  determining a service type of a first multimedia service of the at least one multimedia service communicated between the base station and the at least one second UE based on the WMM profile; and
  determining to forward a session signaling message or send a response message based on the channel condition and a number of multimedia services of the at least one multimedia service having the determined service type.

29. An apparatus for wireless communication, the apparatus being a first UE, comprising:
  means for establishing a wireless wide area network (WWAN) communication link with a base station through a WWAN radio access technology (RAT);
  means for providing an access point accessing the WWAN communication link to at least one second UE through a wireless local area network (WLAN) RAT;
  means for determining a channel condition of the WWAN communication link; and
  means for managing at least one multimedia service between the base station and the at least one second UE based on the channel condition, wherein the means for managing of the at least one multimedia service is further configured to:
    detect a wireless multimedia (WMM) profile of the at least one second UE;
    determine a service type of a first multimedia service of the at least one multimedia service communicated between the base station and the at least one second UE based on the WMM profile; and
    determine to forward a session signaling message or send a response message based on the channel condition and a number of multimedia services of the at least one multimedia service having the determined service type.

30. A method of wireless communication of a first user equipment (UE), comprising:
  establishing a wireless wide area network (WWAN) communication link with a base station through a WWAN radio access technology (RAT);
  providing an access point accessing the WWAN communication link to at least one second UE through a wireless local area network (WLAN) RAT;
  determining a channel condition of the WWAN communication link;
managing at least one multimedia service between the base station and the at least one second UE based on the channel condition, wherein the managing the at least one multimedia service comprises:
  intercepting a signaling message between a third UE and the at least one second UE, wherein the first UE is in communication with the third UE through the WWAN communication link and the base station;
  detecting a video telephony service between the at least one second UE and the third UE;
  determining a communication end point characteristic of the at least one second UE;
  determining a rate of the video telephony service based on the channel condition and the end point characteristic of the at least one second UE; and
  generating an indication message and sending the indication message to the third UE, wherein the indication message includes the determined rate of the video telephony service.

31. An apparatus for wireless communication, the apparatus being a first UE, comprising:
  means for establishing a wireless wide area network (WWAN) communication link with a base station through a WWAN radio access technology (RAT);
  means for providing an access point accessing the WWAN communication link to at least one second UE through a wireless local area network (WLAN) RAT;
  means for determining a channel condition of the WWAN communication link; and
  means for managing at least one multimedia service between the base station and the at least one second UE based on the channel condition, wherein the means for managing the at least one multimedia service is further configured to:
    intercept a signaling message between a third UE and the at least one second UE, wherein the first UE is in communication with the third UE through the WWAN communication link and the base station;
    determine an application to be used to provide the at least one multimedia service between the at least one second UE and the third UE and a communication end point characteristic of the at least one second UE; and
  generate an indication message specific to the application and sending the indication message to the third UE, wherein the indication message includes the communication end point characteristic of the at least one second UE and indicates that the at least one second UE is in communication with the WWAN communication link through the access point.

32. An apparatus for wireless communication, the apparatus being a first UE, comprising:
  means for establishing a wireless wide area network (WWAN) communication link with a base station through a WWAN radio access technology (RAT);
  means for providing an access point accessing the WWAN communication link to at least one second UE through a wireless local area network (WLAN) RAT;
  means for determining a channel condition of the WWAN communication link; and
  means for managing at least one multimedia service between the base station and the at least one second UE based on the channel condition, wherein the means for managing the at least one multimedia service is further configured to:
    intercept a signaling message between a third UE and the at least one second UE, wherein the first UE is in communication with the third UE through the WWAN communication link and the base station;
    detect a video telephony service between the at least one second UE and the third UE;
    determine a communication end point characteristic of the at least one second UE;
    determine a rate of the video telephony service based on the channel condition and the end point characteristic of the at least one second UE; and
    generate an indication message and sending the indication message to the third UE, wherein the indication message includes the determined rate of the video telephony service.

* * * * *